(12) United States Patent
Braidwood et al.

(10) Patent No.: US 12,093,214 B2
(45) Date of Patent: Sep. 17, 2024

(54) ON-CHIP MEMORY SYSTEM FOR A RECONFIGURABLE PARALLEL PROCESSOR

(71) Applicant: AzurEngine Technologies, Inc., San Diego, CA (US)

(72) Inventors: Ryan Braidwood, San Diego, CA (US); Yuan Li, San Diego, CA (US); Jianbin Zhu, San Diego, CA (US); Toshio Nagata, Lake Elsinore, CA (US)

(73) Assignee: AzurEngine Technologies, Inc., San Diego, CA (US)

( * ) Notice: Subject to any disclaimer, the term of this patent is extended or adjusted under 35 U.S.C. 154(b) by 124 days.

(21) Appl. No.: 17/984,360

(22) Filed: Nov. 10, 2022

(65) Prior Publication Data

US 2024/0160601 A1 May 16, 2024

(51) Int. Cl.
*G06F 15/80* (2006.01)
*G06F 13/16* (2006.01)

(52) U.S. Cl.
CPC ...... *G06F 15/8069* (2013.01); *G06F 13/1668* (2013.01)

(58) Field of Classification Search
None
See application file for complete search history.

(56) References Cited

U.S. PATENT DOCUMENTS

| | | | |
|---|---|---|---|
| 6,092,136 A * | 7/2000 | Luedtke | G06F 12/0284 710/305 |
| 10,733,139 B2 | 8/2020 | Li et al. | |
| 10,776,310 B2 | 9/2020 | Li et al. | |
| 10,776,311 B2 | 9/2020 | Zhu et al. | |
| 10,776,312 B2 | 9/2020 | Zhu et al. | |
| 10,956,360 B2 | 3/2021 | Li et al. | |
| 2006/0248317 A1* | 11/2006 | Vorbach | G06F 15/7867 712/221 |
| 2021/0142846 A1* | 5/2021 | Lenjani | G11C 7/1006 |

* cited by examiner

*Primary Examiner* — Michael Sun
(74) *Attorney, Agent, or Firm* — IPro, PLLC

(57) ABSTRACT

A processor may include a plurality of columns of vector processing units arranged in a two-dimensional column array with a plurality of column stacks placed side-by-side in a first direction and each column stack having two columns stacked in a second direction. The processor may further include a memory unit divided into two portions placed on two opposite sides of the column array in the second direction. Each portion may contain two memory blocks placed side-by-side in the first direction. Each memory block may contain two cache blocks placed along a first edge abutting an adjacent memory block and a plurality banks of memory cells placed to space from the first edge in the first direction by the two cache blocks and from a second edge abutting the column array in the second direction by routing channels.

20 Claims, 15 Drawing Sheets

ON-CHIP MEMORY SYSTEM FOR A RECONFIGURABLE PARALLEL PROCESSOR

TECHNICAL FIELD

The disclosure herein relates to computer architecture, particularly relates to an on-chip memory system for a Single Instruction Multiple Threads (SIMT) computer processor.

BACKGROUND

Graphics processing unit (GPU) architecture has provided a way to execute parallel threads in a Single Instruction Multiple Threads (SIMT) fashion. A SIMT processor such as a GPU has many cores configured to execute multiple threads simultaneously and is especially suitable for massive parallel computing applications. To take advantage of multiple cores for parallel execution, computer programs normally have to be tailored for the multi-core architecture by invoking functions of an Application Programming Interface (API) specifically designed to work on multiple cores. More recently, general-purpose computing on GPUs (GPGPU), which makes use of a GPU to perform computation in applications traditionally handled by the central processing unit (CPU), becomes more practical and popular. An on-chip memory system can dramatically improve performance of a processor that has many processing elements. But extensive routing is required to provide memory access, which brings issues of timing closure at a target frequency and dynamic switching power consumption. Therefore, there is a need in the art to implement an on-chip memory system that takes area, delay, and power consumption into consideration.

SUMMARY

The present disclosure describes apparatus, methods and systems for an on-chip memory system of a processor configured for massive thread level parallel processing. The processor may have a high number of dedicated interfaces but lacks a true asynchronous distributed bus. The vector processing units of a process may form columns and the columns of vector processing units may have access to all cache blocks, and thus all memory in the core. To optimize for area, delay, and power consumption, the processor may have a carefully tuned floorplan that have column-to-column interfaces create circular data flow with the final column looping back to the first column via a temporary storage buffer. Each column may have a collection of output FIFOs that drive the succeeding column. The succeeding column inputs may drive muxing logic in the column, which may direct these signals to the memory port, processing element, or to output FIFOs and the next column. The final column may have its output FIFOs drive the temporary storage buffer, which then drives the first column.

To optimize for area and power consumption, columns may be stacked to form column stacks and column stacks may be placed side-by-side, and columns may be arranged in a circular fashion such that output FIFOs have a short routing distance to the muxing logic in the succeeding column. There are many buses that must be driven from one column to the next. The switching logic may operate on a bit-by-bit basis, so the buses may be bit-aligned and interspersed along the column edge.

A centralized-column approach is implemented for the processor. In this approach, columns of vector processing unit are placed in an array with the memory unit divided into portions and placed on either side of the array. The temporary storage buffer may be placed on one end of the column array in a direction perpendicular to the direction of stacking the columns.

In an exemplary embodiment, a processor may comprise a plurality of columns of vector processing units arranged in a two-dimensional column array with a plurality of column stacks placed side-by-side in a first direction and each column stack having two columns stacked in a second direction, and a memory unit divided into two portions that are placed on two opposite sides of the column array in the second direction. Each column may include a processing element (PE) that has a vector Arithmetic Logic Unit (ALU). Each portion of the memory unit may contain two memory blocks placed side-by-side in the first direction. Each memory block may contain two cache blocks and a plurality banks of memory cells. The two cache blocks may be placed along a first edge abutting an adjacent memory block. The plurality of banks of memory cells may be placed to space from the first edge in the first direction by the two cache blocks and from a second edge abutting the column array in the second direction by routing channels.

DETAILED DESCRIPTION

Figure 1:
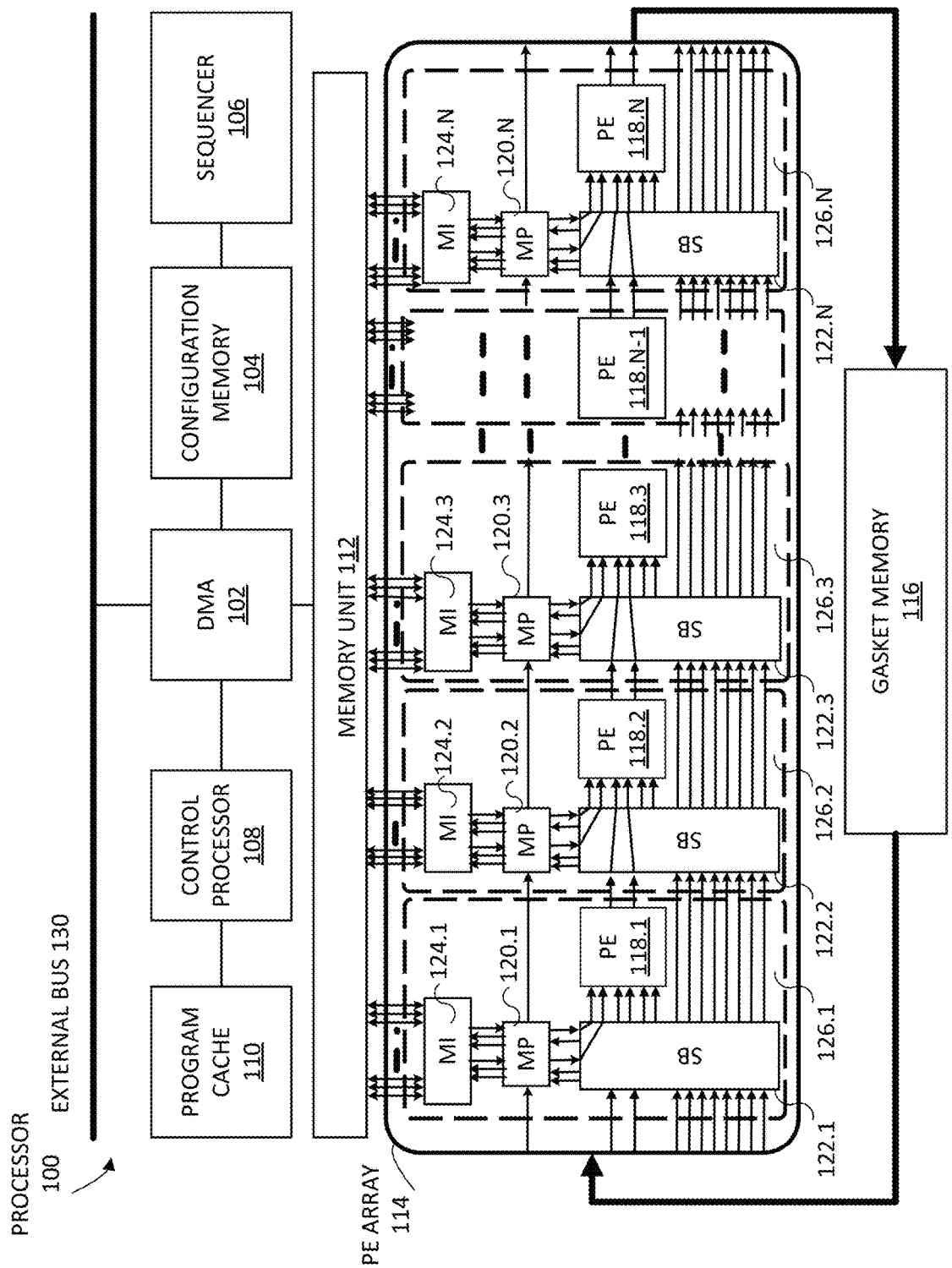
FIG. 1 schematically shows a processor in accordance with an embodiment of the present disclosure.

Reference will now be made in detail to the embodiments of the present teaching, examples of which are illustrated in the accompanying drawings. Like elements in the various figures are denoted by like reference numerals for consistency. While the present teaching will be described in conjunction with the embodiments, it will be understood that they are not intended to limit the present teaching to these embodiments. On the contrary, the present teaching is intended to cover alternatives, modifications, and equivalents, which may be included within the spirit and scope of the present teaching as defined by the appended claims.

In addition, in the following detailed description of embodiments of the present teaching, numerous specific details are set forth in order to provide a thorough understanding of the present teaching. However, it will be recognized by one of ordinary skill in the art that the present teaching may be practiced without these specific details. In other instances, well-known methods, procedures, components, and circuits have not been described in detail as not to unnecessarily obscure aspects of the embodiments of the present teaching.

FIG. 1 schematically shows a processor 100 according to an embodiment of the present disclosure. The processor 100 may comprise a direct memory access (DMA) module 102, a configuration memory 104, a sequencer 106, a control processor 108, a program cache 110, a memory unit 112, a PE array 114 and a gasket memory 116. The DMA module 102 may be coupled to an external bus 130 and may be controlled by the control processor 108. The DMA module 102 may be responsible to move executable instructions and non-executable data in and out from the external bus 130. The program cache 110 may store instructions and data to be used by the control processor 108 to control the operation of the DMA module 102. In one embodiment, the instructions and data stored in the program cache 110 may be used by the control processor 108 to handle kernel programs.

In some embodiments, the processor 100 may be configured for massive thread level parallel processing. For example, one processing element (PE) in the PE array 114 may comprise a vector Arithmetic Logic Unit (ALU) with a vector size more than one and each ALU of a vector ALU may be configured to perform same operation but on different data (e.g., each thread may operate on its own data). That is, in these embodiments with multiple ALUs, each PE may be configured to operate in a Single Instruction Multiple Threads (SIMT) fashion. In one embodiment, a PE with multiple vector data inputs may generate one vector data output. In some embodiments, a thread may also be referred to as a stream.

To provide data for multiple threads to be executed concurrently, in some embodiments, some relevant electronic connections between components of the processor 100 may be in vectors. For example, a vector address connection of K×G bits may have K number of G-bit addresses and a vector data connection of K×M bits may have K number of M-bit data. It should also be noted that although not shown in any of the figures, data or address connections between different components may be accompanied by one or more signal lines. For example, a busy signal line may exist between a first component and a second component, and may be used by the first component to send a busy signal to the second component indicating that the first component is not ready to accept valid data or address signals. Moreover, a valid signal line may also exist between the first and second components, and may be used by the second component to send a valid signal to the first component indicating that valid data or address signals have been put on the connection wires.

The configuration memory 104 may store data path programs including arithmetic and logical instructions, and load and store instructions for data path components. In one embodiment, the data path programs stored in the configuration memory 104 may be sequence(s) of compiled instructions. For example, a data path program may include instructions to be executed by the PE array 114, which may specify what kind of operations PEs may perform, and how data path components may hold or transmit data.

The sequencer 106 may decode the instructions stored in the configuration memory 104. The instructions may include scalar instructions and vector instructions. For a scalar instruction, the sequencer 106 may decode the scalar instruction and perform the scalar operation coded by the scalar instruction. For a vector instruction, the sequencer 106 may decode the vector instruction and deliver the decoded vector instruction to various components of the PE array 114 (e.g., components of the PE array 114 that will be involved in arithmetic and logical operations, and data movement operations), such that the vector operations coded by the vector instruction may be performed by the components of the PE array 114. These components of the PE array 114 may also be referred to as vector processing units. As used herein, a scalar operation may refer to execution of a scalar instruction and a vector operation may refer to execution of a vector instruction.

The decoded vector instruction may be delivered to various components in a package, which may be referred to as a configuration package or simply a configuration. In addition to the decoded instruction, a configuration package for one component may include some other parameters (e.g., the number of warps specifying how many times an instruction is to be repeatedly executed and how many times data passes through a data switching unit in one configuration setting, and immediate values passed from the sequencer to the components). In one embodiment, a physical data path configuration may be referred to as a physical data path program, which may comprise individual configurations for various components included in a physical data path.

Although not shown, there may be a configuration bus connecting the sequencer 106 to the components of the PE array 114 for individual configurations to be delivered to these components via the bus. For example, there may be a configuration bus for delivering the configurations for the memory ports, switch boxes and PEs. In some embodiments, the configuration for the memory ports may include data preparation instructions, such as but not limited to, LOAD/STORE instructions (and parameters, such as addresses, for the instructions), and the configuration for the PEs may include instructions to be executed by the ALUs in the PEs, such as but not limited to, data crunching instructions like addition or subtraction.

The memory unit 112 may be a data staging area to store data received from the external bus 130 and also execution result data generated by the PE array 114 (before these results may be transmitted away via the external bus 130). In some embodiments, the memory unit 112 may be an in-processor cache for a large memory system external of the processor 100.

The PE array 114 may comprise a plurality of memory ports (MPs) 120.1-120.N, a plurality of switch boxes (SBs) 122.1-122.N, and a plurality of processing elements (PEs) 118.1-118.N. These components may form N columns 126.1-126.N of programmable hardware units or programmable hardware components. For example, the MP 120.1, SB 122.1, and PE 118.1 may form the first column 126.1 of the PE array 114, and the MP 120.N, SB 122.N, and PE 118.N may form the Nth column 126.N of the PE array 114. Each column of programmable hardware units may also be referred to as a column of vector processing units or simply a column in an embodiment in which each of these hardware units is configured for vector processing. In the example shown in FIG. 1, the PE array 114 may comprise one row of processing elements 118.1-118.N, which may include N PEs with N being an integer number. In the embodiments described herein, the number N may be 32. But this is an example and it may be another integer number in other embodiments, such as, but not limited to, 16, 64, etc. Although these example numbers given may be power of 2, the number of PEs in one row need not be a power of 2 in one embodiment.

The plurality of MPs 120.1-120.N may be programmable hardware units controlling data flow between the PE array 114 and the memory unit 112. As shown in FIG. 1, the plurality of MPs 120.1-120.N may be coupled to the memory unit 112 via a plurality of memory interfaces (MIs) 124.1-124.N. Each MP 120.1-120.N may be coupled to the memory unit 112 via a respective MI 124.1-124.N to read from and write to the memory unit 112. Thus, the MI 124.1 may be the gateway to the memory unit 112 for the first column 126.1 of PE array 114, and so on until the MI 124.N may be the gateway to the memory unit 112 for the N-th column 126.N of PE array 114. Each MP 120.1-120.N may also be coupled to a SB in a respective column to transmit data to and from each column. For example, MP 120.1 may be coupled to SB 122.1, MP 120.2 may be coupled to SB 122.2, and so on. In some embodiments, the memory unit 112 and the MIs 124.1-124.N may be collectively referred to as a multi-port memory unit. Moreover, in at least one embodiment, the memory unit 112, the MIs 124.1-124.N and MPs 120.1-120.N may support two memory accessing modes: a private memory access mode and a shared memory access mode, which may also be referred to as the private memory access method (or simply private memory access) and shared memory access method (or simply shared memory access). It should be noted that while MIs 124.1-124.N are shown as separate entities in FIG. 1, in some embodiments, they may be implemented as part of respective MPs 120.1-120.N, or in some other embodiments, as part of the memory unit 112.

With the exception of MP 120.1 and MP 120.N, all MPs may be coupled to two adjacent MPs such that each MP may be configured to receive addresses from a preceding MP and/or transmit addresses to a succeeding MP. The electronic coupling between MPs may provide a one-way flow of addresses (e.g., if one configuration specifies that addresses may flow from one MP to a next MP). For example, as shown in FIG. 1, MP 120.1 may be coupled to MP 120.2 for one-way flow of addresses, MP 120.2 may be coupled to MP 120.3 for one-way flow of addresses. The last MP 120.N may be an exception and coupled to the gasket memory 116, which may provide a temporary storage for addresses. The first MP 120.1 may be another exception in that it may receive one-way flow of addresses from the gasket memory 116. In some embodiments, the MPs 120.1-120.N may form an address routing bus along a PE row direction. That is, addresses may be routed between MPs in a direction that is parallel to the direction in which data may be routed between PEs and SBs. In at least one embodiment, the addresses transmitted between the MPs may be memory addresses updated by a MP. For example, a MP may perform some operation on the memory addresses (e.g., updating memory addresses) and pass the updated memory addresses to the next MP in the succeeding column.

The gasket memory 116 may be used as a data buffer, for example, first-in-first-out (FIFO), to collect addresses and data from the PE array (e.g., from MP 120.N, PE 118.N and/or SB 122.N) and feed them back to the PE array (e.g., to MP 120.1, and/or SB 122.1) when the first column of the PE array (e.g., MP 120.1, SB 122.1, and PE 118.1) is reconfigured by new configurations.

In some embodiments, the PEs, SBs, and MPs may be statically configured while processing a thread block. For example, each of PEs, SBs, and MPs may be programmed with instructions specified in respective configurations to perform one stage of a pipeline. No instructions may be changed while data in the thread block are passing through the pipeline stage. The address computation instructions and memory access instructions such as LOAD and STORE may be mapped to MPs (e.g., packaged in configurations sent to respective MPs), the data switching instructions may be mapped to SBs (e.g., packaged in configurations sent to respective SBs), and other instructions may be mapped to PEs (e.g., packaged in configurations sent to respective PEs).

As illustrated in FIG. 1, each of the SB 122.1-122.N may be coupled to two adjacent SB (e.g., a preceding SB and a succeeding SB), with the exception of SB 122.1 and SB 122.N. SB 122.1 may be coupled to the MP 120.1, the gasket memory 116, PE 118.1 and the SB 122.2. And SB 122.N may be coupled to the MP 120.N, the gasket memory 116, PE 118.N and the SB 122.N-1. In some embodiments, the SBs 122.1-122.N may form data routing buses along a PE row direction. That is, data may be routed between SBs in a direction that is parallel to the direction in which data may be routed between PEs. In one embodiment, one or more SBs may be used to route data to bypass one or more PEs.

The SBs 122.1-122.N may be configured to provide data switching for data to be routed between neighboring PEs, from a PE to a MP, from a PE to the data routing buses, from a MP to a PE, from a MP to the data routing buses, from the data routing buses to a PE, and from the data routing buses to a MP. For example, the switch box 122.1 may be configured to provide data switching for data to be delivered to the processing element 118.1 from the gasket memory 116, the MP 120.1 or both. Moreover, the switch box 122.1 may be configured to route data from the gasket memory 116 to the MP 120.1. As another example, the switch box 122.2 may be configured to provide data switching for data to be delivered to the processing element 118.2 from the processing element 118.1, the MP 120.2, and/or the SB 122.1. Moreover, the switch box 122.2 may be configured to route data from the processing element 118.1 to the MP 120.2 or SB 122.3, from the SB 122.1 to the MP 120.2 or SB 122.3. In yet another example, the switch box 122.N may be configured to provide data switching for data to be delivered to the processing element 118.N from the PE 118.N-1, the MP 120.N, the SB 122.N-1 or any combination of the three sources. Moreover, the switch box 122.N may be configured to route data between PE 118.N-1, MP 120.N, SB 122.N-1 and the gasket memory 116. A SB may also be referred to as a data switching unit.

In some embodiments, output ports of vector processing units (e.g., each MP, each SB, and each PE) may be vector address or vector data ports. Address or data buffers at the output ports may be treated as vector registers. For example, a data buffer at one output port of the PE 118.1 coupled to the SB122.2 may be treated as a vector register for holding a vector of input values to the SB122.2. A data buffer at another output port of the PE 118.1 coupled to the SB122.2 may be treated as another vector register to hold another vector of input values to the SB 122.2. Also, data buffers at output ports of the SB 122.1 coupled to the SB 122.2 may be treated as vector registers for holding vectors of data values to be passed to the SB 122.2.

In one embodiment, data or address buffers at output ports of vector processing units may be mapped to vector registers labeled as VA, VB, IA, IB, IC, ID, IE, IF, IG, IH and DVA. VA and VB may be vector registers for output data buffers of a PE. IA, IB, IC, ID, IE, IF, IG, and IH may be vector registers for output data buffers of a SB at output ports coupled to input ports of the succeeding SB or the gasket memory. DVA may be a vector register for an output address buffer of a MP. Also, virtual vector registers MA and MB may be mapped to data connections from a MP to a SB so that the SB may route data read from the memory unit 112 to input ports of a PE. MA and MB may represent data obtained by the shared memory access and by the private memory access, respectively. The width of DVA may be K×G bits. The widths of other vector registers may be K×M bits. To support 2×M-bit operations, 2 vector registers may be concatenated into a register pair and labeled as VAB, IAB, ICD, IEF, IGH, and MAB. For example, IAB may indicate a concatenated vector register pair (IB, IA) with IB being the higher M bits and IA being the lower M bits. Here (,) denotes component by component concatenation of M-bit data from 2 vector registers.

An exemplary data path may be illustrated by the exemplary internal connections of the SBs 122.1 to 122.N. For example, as shown in FIG. 1, SB 122.1 may show that two inputs of PE 118.1 may be coupled to two outputs from MP 120.1, SB 122.2 may show that two inputs of PE 118.2 may be coupled to two outputs from MP 120.2 and another two inputs of PE 118.2 may be coupled to two outputs from PE 118.1, SB 122.3 may show that two inputs of PE 118.3 may be coupled to two outputs from MP 120.3 and another two inputs of PE 118.3 may be coupled to two outputs from PE 118.2, and so forth, until SB 122.N may show that two inputs of PE 118.N may be coupled to two outputs from MP 120.N and another two inputs of PE 118.N may be coupled to two outputs from PE 118.N-1.

To simplify wording, a MP (or a MP 120) may refer to one of the MPs 120.1-120.N, a SB (or a SB 122) may refer to one of the SBs 122.1-122.N, and a PE (or a PE 118) may refer to one of the PEs 118.1-118.N.

A mixed-scalar-vector instruction set may be defined for the processor 100. The MPs 120.1-120.N, SBs 122.1-122.N, and PEs 118.1-118.N may be vector processing units of the processor 100 and the sequencer 106 may be a scalar processing unit of the processor 100. The instruction set may be designed such that one instruction may be executed by one programmable unit. For example, in one embodiment, each instruction may have 32 bits and certain bits of each instruction (e.g., the most significant 4 bits, the least significant four bits, or other bits) may identify the unit (e.g., the sequencer 106 or one component of the PE array 114) that executes the instruction.

Kernel programs may be made up of series of group of instructions. Scalar instructions may generate parameters used in vector instructions and manage loops and branches. Vector instructions may configure data paths in columns, control data flow and perform data crunching operations. One group of instructions may configure one column. An instruction for a PE including a no-operation (NOP) may be a delimiter of the group. In some embodiments, instructions in one group may be organized such that scalar instructions that generate parameters for vector instructions are placed before vector instructions. Columns do not directly decode vector instructions. Instead, the sequencer 106 may decode scalar and vector instructions, execute decoded scalar instructions and package decoded vector instructions in configurations and send configurations of memory ports (MPs 120.1-120.N), switch boxes (SBs 122.1-122.N), and processing elements (PEs 118.1-118.N) to columns.

In various embodiments, the processor 100 may be configured to perform Single Instruction Multiple Threads (SIMT) execution. A group of threads may form a block and a group of blocks may be organized into a grid. A kernel program may define a grid of blocks of threads for execution. Each block and thread may have a unique block and thread identifier (e.g., block ID and thread ID), respectively. The block ID for a block in a three-dimensional grid may be calculated as blockId=blockIdx.x+(blockIdx.y*gridDim.x)+(blockIdx.z*(gridDim.x*gridDim.y)). Variables blockIdx.x, blockIdx.y, and blockIdx.z may be the block ID in the x-axis, y-axis, and z-axis of the block, respectively. Variables gridDim.x and gridDim.y may be grid dimensions in the x-axis and y-axis, respectively. The "*" operator is the multiplication operator. The thread ID for thread in a three-dimensional block may be calculated as threadId=blockId*(blockDim.x*blockDim.y*blockDim.z)+threadIdx.x+(threadIdx.y*blockDim.x)+(threadIdx.z*(blockDim.x*blockDim.y)). Variables threadIdx.x, threadIdx.y, and threadIdx.z may be the thread ID in the x-axis, y-axis, and z-axis of the thread, respectively. Variables blockDim.x, blockDim.y, and blockDim.z may be block dimensions in the x-axis, y-axis, and z-axis, respectively.

As used herein, the capital letters X, Y, and Z may refer to dimensions of a thread block in the x-axis, y-axis, and z-axis of the block, respectively. In one embodiment, the values for X, Y, and XYZ (e.g., the multiplication product of X times Y times Z) may be set by the system in the internal memory of the sequencer 106 before launching a kernel. And the sequencer 106 may load the dimensions from the internal memory, store the dimensions in a scalar register of the sequencer 106 and deliver them as immediate values in configurations to columns (e.g., MPs in a column).

Figure 2:
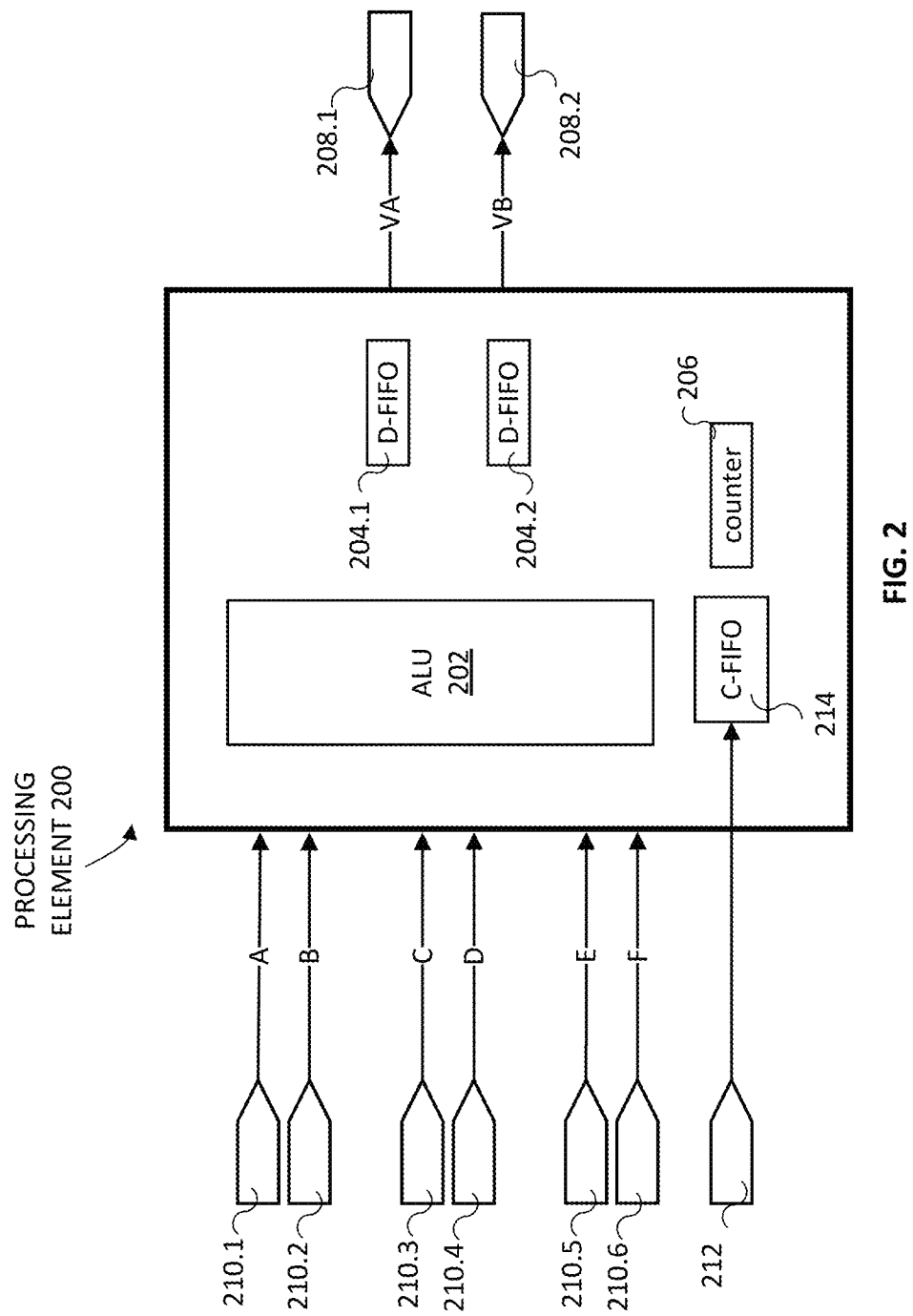
FIG. 2 schematically shows a processing element for a processor in accordance with an embodiment of the present disclosure.

FIG. 2 schematically shows a processing element (PE) 200 in accordance with an embodiment of the present disclosure. The PE 200 may be an embodiment of a PE 118. The PE 200 may comprise an Arithmetic Logic Unit (ALU) 202, a plurality of data buffers (e.g., D-FIFO 204.1, and 204.2), a counter 206, a plurality of data outputs (e.g., 208.1 and 208.2), a plurality of data inputs (e.g., 210.1 through 210.6), a configuration input 212 and a configuration buffer (e.g., C-FIFO 214). In one embodiment, the ALU 202 may be one ALU (e.g., one ALU that is configured to process one piece of data at a time and may be referred as a scalar ALU). In most embodiments, the ALU 202 may be a plurality of ALUs (or referred to as a vector ALU), for example, K ALUs, and Single Instruction Multiple Threads (SIMT) operation may be performed by the PE. As used herein, the capital letter K may be referred to as the vector size of ALU and an example K may be 32. It should be noted that the same vector size K may be applied in MPs, SBs, for example, for a vector register and a vector data bus. Please note that a scalar ALU may be a special case of a vector ALU with a vector size being one.

Data received from the data inputs 210.1 through 210.6 may be denoted as A, B, C, D, E, and F. Data sent to the data outputs 208.1 and 208.2 may be denoted as VA and VB. In an embodiment in which the ALU 202 may be one ALU, the widths of the data inputs 210.1 through 210.6 and the data outputs 208.1 and 208.2 may be M bits. The width of the ALU may be configured to be either M bits or 2×M bits by the configuration. If the width is M bits, the inputs of the ALU are A, B, and C. The output of the ALU is VA. If the width is 2×M bits, the inputs of the ALU are (B, A), (D, C) and (F, E). The output of the ALU is (VB, VA). Here (,) denotes concatenation of M-bit data. For example, when M is 8, inputs and outputs of ALU may be 8 bits; when M is 16, inputs and outputs of ALU may be 16 bits; when M is 32, inputs and outputs of ALU may be 32 bits; and so on. Input data pieces A, B, C, D, E, and F, and output data pieces VA and VB may be M bits. In an embodiment in which the ALU 202 may be a vector ALU, the data inputs 210.1 through 210.6 and the data outputs 208.1 and 208.2 may be vectors of K×M bits. And input data pieces A, B, C, D, E, and F, and output data pieces VA and VB may be vectors of K×M bits.

The data buffers 204.1 and 204.2 may be coupled to the data outputs 208.1 and 208.2 to temporarily store data pieces. The data buffers 204.1 and 204.2, which may be mapped to the vector registers VA and VB, respectively, may be used to decouple the timing of PEs from that of the succeeding SBs or the gasket memory. In one embodiment, the buffers may be implemented as FIFOs (e.g., a D-FIFO for a data buffer, a C-FIFO for a configuration buffer).

The configuration buffer C-FIFO 214 may receive configurations from the configuration input 212, which may be coupled externally to the sequencer 106 via the configuration bus, and store the received configurations before any execution of a data path starts. The configurations for the PE 200 may be referred to as PE configurations. The PE 200 may be statically configured while processing a thread block, e.g., the PE 200 may be programmed with instructions specified in the configuration to perform one stage of a pipeline. No instructions may be changed while data in the thread block are passing through the PE 200. One of the configuration parameters XYZ may be used to obtain the number of executions which may be specified by ceil (XYZ/K). Here function ceil(x) returns the least integer value greater than or equal to x. The counter 206 may be programmed with the number of executions and used to count the data passing through the data output 208.1. When the counter value has reached the number of executions, a new configuration may be applied. Therefore, reconfiguration capability may be provided in each PE. In one embodiment, the specified number of executions for an instruction may be referred to as NUM_EXEC and this NUM_EXEC may be equal for all components in one data path.

Figure 3:
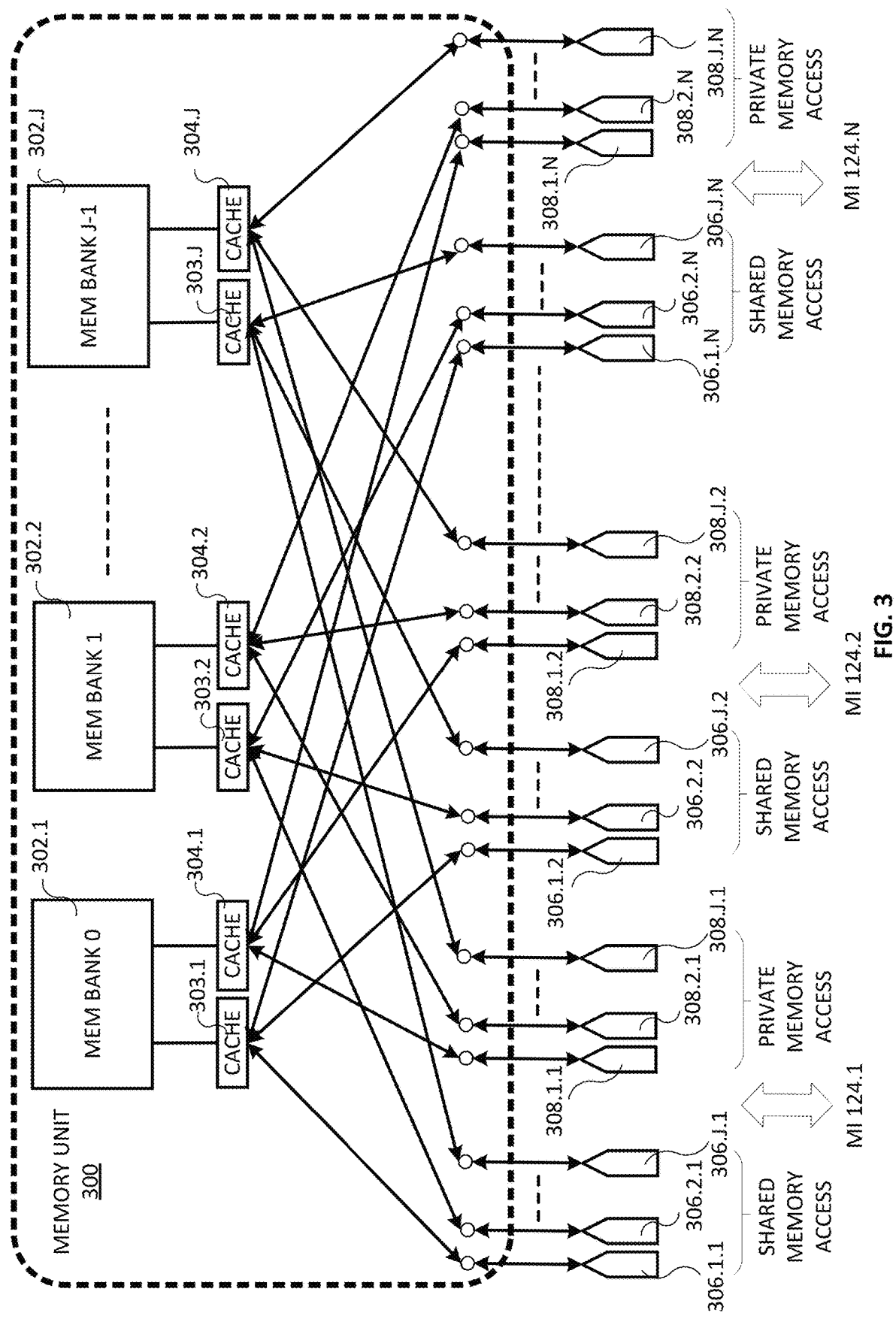
FIG. 3 schematically shows a memory unit for a processor in accordance with an embodiment of the present disclosure.

FIG. 3 schematically shows a memory unit 300 for the processor 100 in accordance with an embodiment of the present disclosure. The memory unit 300 may be an embodiment of the memory unit 112 and may serve as an on-chip cache for the PE array 114. The memory unit 300 may comprise a plurality of memory banks (e.g., memory bank 0 denoted as 302.1, memory bank 1 denoted as 302.2, memory bank J-1 denoted as 302.J, etc.), a plurality of memory caches 303.1 through 303.J for shared memory access and a plurality of memory caches 304.1 through 304.J for private memory access. Each of the memory banks 302.1 through 302.J may be coupled to a respective cache 303 for shared memory access and a respective cache 304 for private memory access. For example, the memory bank 302.1 may be coupled to the cache 303.1 and cache 304.1, the memory bank 302.2 may be coupled to the cache 303.2 and cache 304.2, and so on until the memory bank 302.J may be coupled to the cache 303.J and 304.J. In one embodiment, the memory unit 300 may be a J-way interleaved memory where J may be a power of 2.

Each cache 303 may be individually coupled to all of the plurality of MIs 124.1-124.N for shared memory access via connection ports 306, and each cache 304 may be individually coupled to all of the plurality of MIs 124.1-124.N for private memory access via connection ports 308. Each of the connection ports 306 and 308 may use two subscriptions to identify its connection, with the first subscription identifying the memory cache (by the memory cache subscription 1 to J) and the second subscription identifying the MI (by the MI subscription 1 to N). For example, the connection port 306.1.1 may be for shared memory access for memory cache 303.1 and MI 124.1, the connection port 306.2.1 may be for shared memory access for memory cache 303.2 and MI 124.1, and so on until the connection port 306.J.1 may be for shared memory access for memory cache 303.J and MI 124.1; the connection port 306.1.2 may be for shared memory access for memory cache 303.1 and MI 124.2, the connection port 306.2.2 may be for shared memory access for memory cache 303.2 and MI 124.2, and so on until the connection port 306.J.2 may be for shared memory access for memory cache 303.J and MI 124.2; the connection port 306.1.N may be for shared memory access for memory cache 303.1 and MI 124.N, the connection port 306.2.N may be for shared memory access for memory cache 303.2 and MI 124.N, and so on until the connection port 306.J.N may be for shared memory access for memory cache 303.J and MI 124.N.

Similarly, the connection port 308.1.1 may be for private memory access for memory cache 304.1 and MI 124.1, the connection port 308.2.1 may be for private memory access for memory cache 304.2 and MI 124.1, and so on until the connection port 308.J.1 may be for private memory access for memory cache 304.J and MI 124.1; the connection port 308.1.2 may be for private memory access for memory cache 304.1 and MI 124.2, the connection port 308.2.2 may be for private memory access for memory cache 304.2 and MI 124.2, and so on until the connection port 308.J.2 may be for private memory access for memory cache 304.J and MI 124.2; the connection port 308.1.N may be for private memory access for memory cache 304.1 and MI 124.N, the connection port 308.2.N may be for private memory access for memory cache 304.2 and MI 124.N, and so on until the connection port 308.J.N may be for private memory access for memory cache 304.J and MI 124.N.

It should be noted that both the number of caches 303 and the number of caches 304 may match the number of memory banks, denoted by capital letter J. And the number of MIs 124 may match the number of columns, denoted by capital letter N. The number of memory banks does not need to be identical to the vector size. For example, a vector (e.g., vector ALU, vector address, vector data ports) may have a vector size K, a PE array may have a number of columns N, and a memory unit may have a number of memory banks J. And K, N and J may be all different. In one embodiment, K may be divisible by J, J may be a power of 2, and the bit width of J minus 1 may be L (e.g., L is $\log_2 (J)$). For example, J and L may be eight (8) and three (3), respectively, K may be 32 and N may also be 32.

Figure 4A:
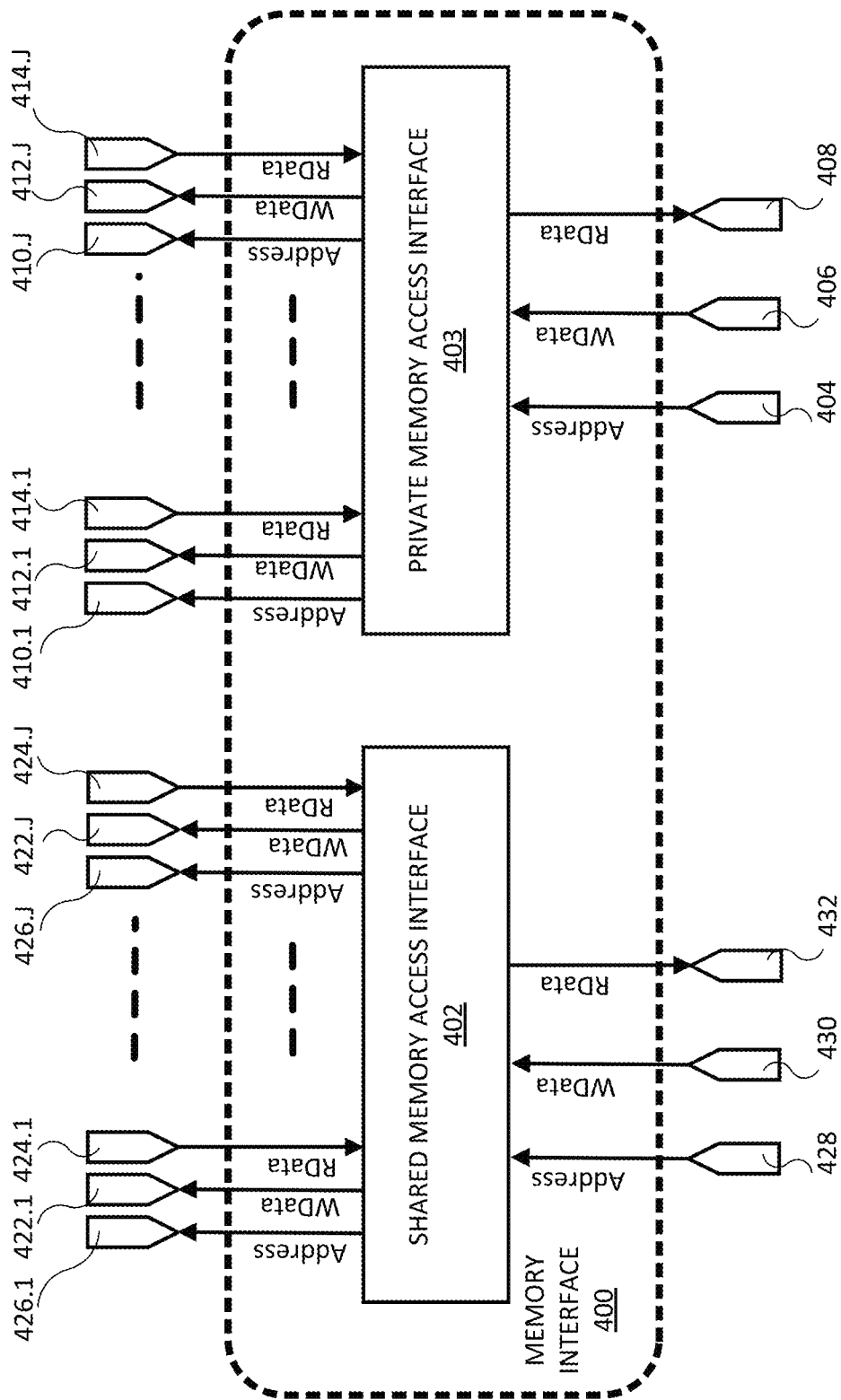
FIG. 4A schematically shows a memory interface in accordance with an embodiment of the present disclosure.

FIG. 4A schematically shows a memory interface (MI) 400 in accordance with an embodiment of the present disclosure. The MI 400 may be an embodiment of MI 124 of FIG. 1. In some embodiments, the memory interface may be referred to as a root box. The MI 400 may comprise a shared memory access interface 402 for shared memory access mode and a private memory access interface 403 for private memory access mode. The private memory access interface 403 may comprise an address port 404, a write data (WData) port 406 and a read data (RData) port 408 coupled to a memory port. The private memory access interface 403 may also comprise a plurality of address ports 410.1-410.J, a plurality of WData ports 412.1-412.J and a plurality of RData ports 414.1-414.J coupled to the memory unit 300. The shared memory access interface 402 may comprise an address port 428, a WData port 430 and a RData port 432 coupled to a memory port. The shared memory access interface 402 may also comprise a plurality of address ports 426.1-426.J, a plurality of WData ports 422.1-422.J and a plurality of RData ports 424.1-424.J coupled to the memory unit 300.

For connections to the memory unit 300, a set of address, WData and RData buses may be coupled to one connection port 306.1.1-306.J.N and 308.1.1-308.J.N shown in FIG. 3. For example, the address port 410.1, WData port 412.1 and RData port 414.1 of MI 124.1 may be coupled to the connection port 308.1.1 of the memory unit 300; the address port 410.J, WData port 412.J and RData port 414.J of MI 124.1 may be coupled to connection port 308.J.1. Meanwhile, the address port 410.1, WData port 412.1 and RData port 414.1 of MI 124.N may be coupled to the connection port 308.1.N of the memory unit 300; the address port 410.J, WData port 412.J and RData port 414.J of MI 124.N may be coupled to connection port 308.J.N Similarly, the address port 426.1, WData port 422.1 and RData port 424.1 of MI 124.1 may be coupled to the connection port 306.1.1 of the memory unit 300; the address port 426.J, WData port 422.J and RData port 424.J of MI 124.1 may be coupled to connection port 306.J.1. Meanwhile, the address port 426.1, WData port 422.1 and RData port 424.1 of MI 124.N may be coupled to the connection port 306.1.N of the memory unit 300; the address port 426.J, WData port 422.J and RData port 424.J of MI 124.N may be coupled to connection port 306.J.N.

In one embodiment, each of the WData ports and RData ports coupled to a memory port may be configured for vector data connections. For example, the WData port 406 may be a K×M-bit input port, and the RData port 408 may be a K×M-bit output port.

Address ports 404 and 428 may be configured to use vector addresses. In the private memory access mode, K addresses in one vector address may be continuous in ascending order in accordance with the thread ID. Thus, only the address for the thread with the least thread ID may need to be specified by the vector address, and the width of the address port 404 may be G bits, in one embodiment. Also, assuming J is less than or equal to K, the width of data ports of each bank (e.g., 412 and 414) may be (K/J)×M bits. Since the memory unit 300 may be a J-way interleaved memory, the least significant L bits of the address may determine the memory bank where data for the address may reside. Here L may be the bit width of J minus 1. All K data in one vector data may be evenly distributed among all memory banks and accessible without memory contention.

In the shared memory access mode, K addresses in one vector address may be different from each other. Data accessed by the vector address may be randomly spread in all memory banks which may result in memory contention. The width of the address port 428 may be K×G bits. The width of data ports of each bank (e.g., 422 and 424) may be M bits. The shared memory access interface 402 may resolve the memory contention.

Figure 4B:
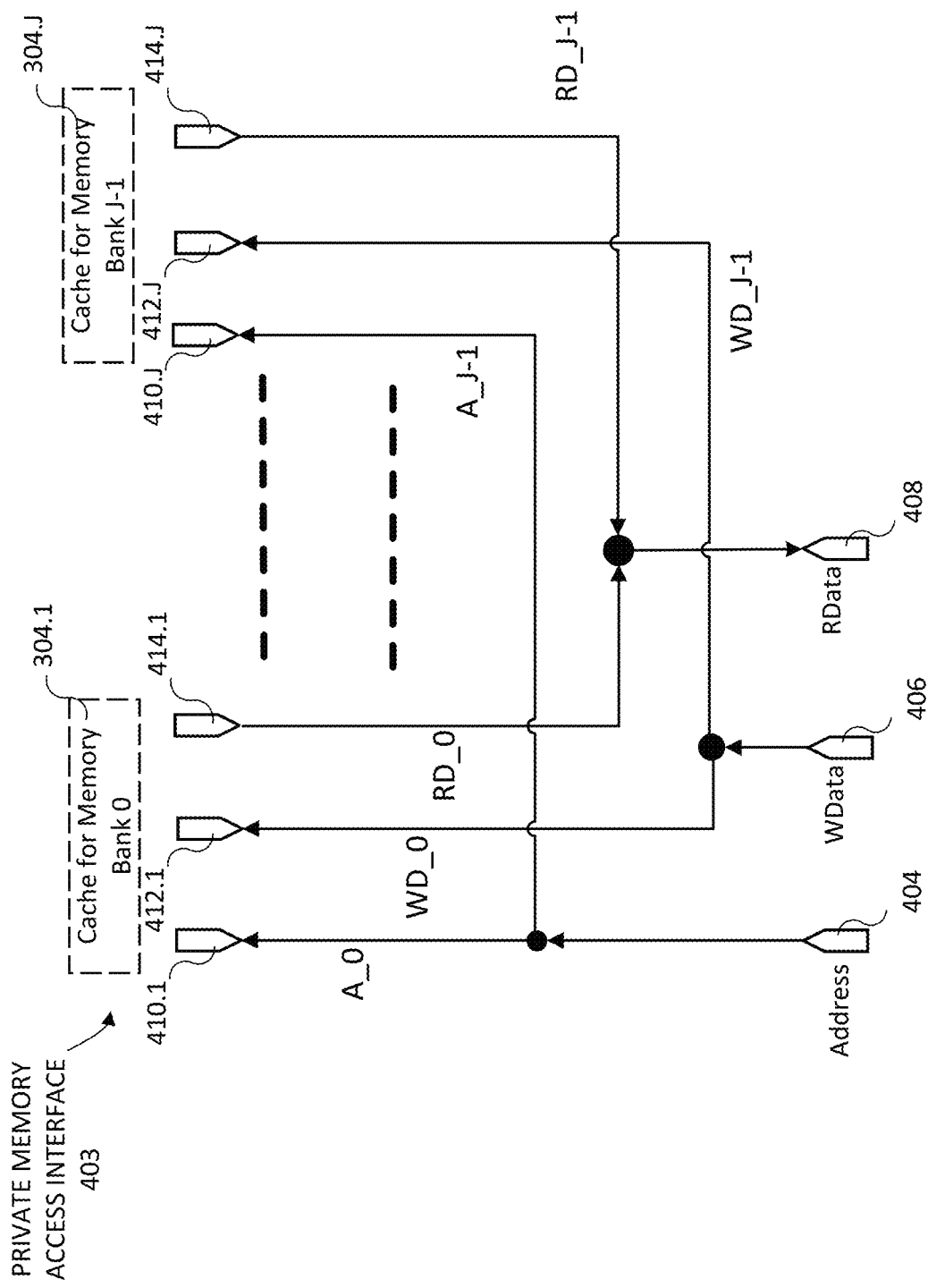
FIG. 4B schematically shows a private memory access interface in accordance with an embodiment of the present disclosure.

FIG. 4B schematically shows the private memory access interface 403 for private memory access in accordance with an embodiment of the present disclosure. The width of the memory address received at the address port 404 may be G bits. By adding 0, 1, 2, . . . , and J-1 to the address at address port 404, J addresses may be created. The least significant L bits of each of J addresses may be examined and the remaining G minus L bits (e.g., G-L bits) may be assigned to one of addresses A_0 through A_J-1 whose index matches the least significant L bits. The addresses A_0 through A_J-1 may be delivered to the memory banks via address ports 410.1 through 410.J. The widths of the vector data at the WData port 406 and at RData port 408 may be K×M bits. K data in the vector may be indexed from 0 to K−1. The least significant L bits of the address at address port 404 may be added to the K indices then the lower L bits of the results may be taken as indices of K data. At WData port 406, data with the same index are concatenated into data of (K/J)×M bits and assigned to one of write data WD_0 through WD_J-1 whose index matches that of concatenated data. The write data WD_0 through WD_J-1 may be delivered to the memory banks via WData ports 412.1 through 412.J. At RData port 408, (K/J)×M bits of read data RD_0 through RD J-1 may be received from each memory bank via RData ports 414.1 through 414.J. Each read data of (K/J)×M bits may be split into K/J of M-bit data then organized into a K×M-bit vector using the indices in the reversed process of creating (K/J)×M-bit write data WD_0 through WD_J-1 from a K×M-bit vector.

Figure 4C:
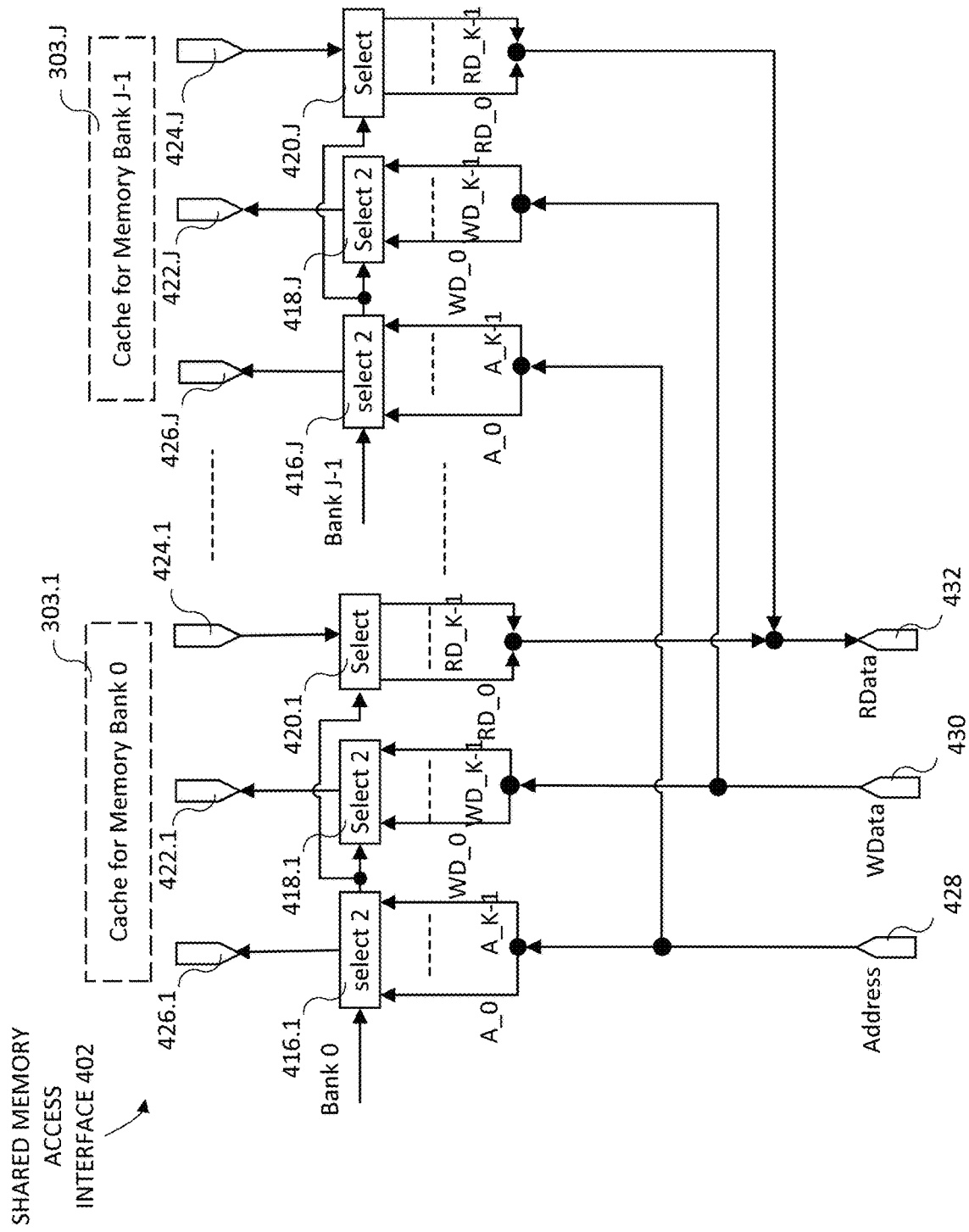
FIG. 4C schematically shows a shared memory access interface in accordance with an embodiment of the present disclosure.

FIG. 4C schematically shows the shared memory access interface 402 for shared memory access in accordance with an embodiment of the present disclosure. The address port 428 may be configured for a vector address of K×G bits, for example, K addresses of G bits as A_0, A_1 . . . , A_K−1. The number K may correspond to the vector size K of the vector ALU in a PE 118. The K addresses may be delivered to a plurality of address selection units (e.g., "Select 2" units 416.1 through 416.J). Each address selection unit 416.1 through 416.J may take the index of each memory bank as an input, for example, index 0 for "Bank 0", . . . , and index J-1 for "Bank J-1", scan the addresses from A_0 to A_K−1, pick up all addresses whose least significant L bits match the bank index, and send remaining G-L bits of the addresses one by one to the memory bank through the address port 426 (e.g., address port 426.1 for memory bank 0 cache 303.1, address port 426.J for memory bank J-1 cache 303.J, etc.). The width of the address port 426 may be G-L bits.

Because more than one address may be directed to the same memory bank, write data selection units (e.g., "Select 2" units 418.1 through 418.J) and read data selection units (e.g., "Select" units 420.1 through 420.J) may be provided to match the data being written to or read from the memory bank with the address sent to the memory bank. Each of the write data selection unit 418.1 through 418.J may receive the index of each address (e.g., 0 to K−1) sent to a corresponding address port 426.1 through 426.J from a corresponding address selection unit 416.1 through 416.J, and send one of the write data (e.g., WD_0 through WD_K−1) with the same index to WData port 422.1 through 422.J (e.g., WData port 422.1 for memory bank 0 cache 303.1, WData port 422.J for memory bank J-1 cache 303.J, etc.). For example, if the address selection unit 416.1 sends G-L bits of A_2, A_15, and A_28 to address port 426.1, the write data selection unit 418.1 receives indices 2, 15, and 28, and sends WD_2, WD_15, and WD_28 to WData port 422.1. Each of the read data selection unit 420.1 through 420.J may receive the index of each address (e.g., 0 to K−1) sent to a corresponding address port 426.1 through 426.J from a corresponding address selection unit 416.1 through 416.J, and assign the data received from RData port 424.1 through 424.J (e.g., RData port 424.1 for memory bank 0 cache 303.1, RData port 424.J for memory bank J-1 cache 303.J, etc.) to one of the read data (e.g., RD_0 through RD_K−1) with the same index. For example, if the address selection unit 416.1 sends G-L bits of A_2, A_15, and A_28 to address port 426.1, the read data selection unit 420.1 receives indices 2, 15, and 28, and assigns the data received from RData port 424.1 to RD_2, RD_15, and RD_28.

Figure 5:
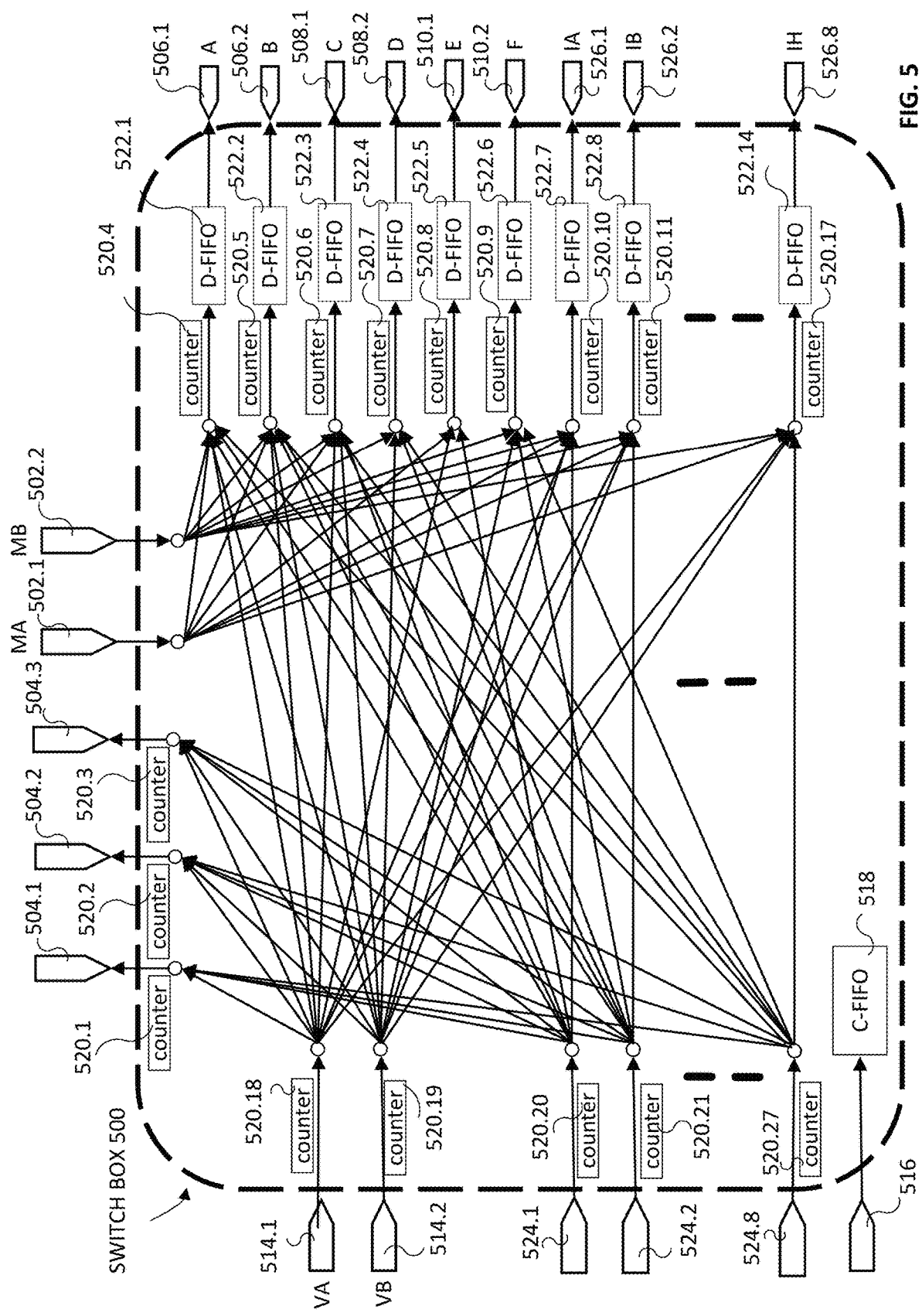
FIG. 5 schematically shows a switch box for a processor in accordance with an embodiment of the present disclosure.

FIG. 5 schematically shows a switch box (SB) 500 in accordance with an embodiment of the present disclosure. The SB 500 may be an embodiment of a SB 122 and may comprise a plurality of data inputs and data outputs, and inter-connections that couple the data inputs to data outputs for data switching. The data inputs of SB 500 may comprise data inputs 502.1, 502.2, 514.1, 514.2 and 524.1 through 524.8. The data outputs of SB 500 may comprise data outputs 504.1 through 504.3, 506.1, 506.2, 508.1, 508.2, 510.1, 510.2 and 526.1 through 526.8.

Externally, the data inputs 502.1 and 502.2 may be coupled to data outputs (e.g., read data ports) of a MP and mapped to the virtual vector registers MA and MB, respectively. One of them may be coupled to a private memory access data output and another may be coupled to a shared memory access data output. The data output 504.1 may be coupled to a data input port of a MP. The data outputs 504.2 and 504.3 may be coupled to data inputs (e.g., write data ports) of a MP, respectively. One of them may be coupled to a private memory access write data port and another may be coupled to a shared memory access write data port. The data inputs 514.1 and 514.2 may be coupled to data outputs 208.1 and 208.2 (e.g., labeled VA and VB) of a PE (or corresponding outputs of the gasket memory in case of SB 122.1), respectively. The data inputs 524.1 through 524.8 may be coupled to data outputs 526.1 through 526.8 of a SB of a preceding column (or corresponding outputs of the gasket memory in case of SB 122.1), respectively. The data outputs of 506.1, 506.2, 508.1, 508.2, 510.1, 510.2 may be coupled to data input ports 210.1 through 210.6 of a PE, respectively. Data pieces output from the data outputs 506.1, 506.2, 508.1, 508.2, 510.1 and 510.2 may be denoted as A, B, C, D, E, and F and data pieces input from the data inputs 514.1 and 514.2 may be denoted as VA and VB. These data pieces A, B, C, D, E, and F may be the input data to a PE 118 and VA and VB may be output data from a PE 118 as described herein.

The SB 500 may further comprise a configuration buffer 518 and a corresponding configuration input 516. The configuration buffer 518 may be implemented as a First-In-First-Out buffer and referred to as C-FIFO 518. The configuration input 516 may be coupled externally to the configuration bus that is coupled to the sequencer 106 for the SB 500 to receive configurations from the sequencer 106. The configurations for the SB 500 may be referred to as SB configurations. Moreover, the SB 500 may further comprise a plurality of counters 520.1-520.27. With the exception of the data inputs 502.1 and 502.2, each of other data inputs and all data outputs may have a corresponding counter 520. In addition, the SB 500 may also comprise a plurality of data buffers 522.1-522.14, which may be implemented as a data First-In-First-Out buffer and referred to as D-FIFO 522.1-522.14. Each of the D-FIFO 522.1-522.14 may provide a respective output buffer for each of the data outputs 506.1, 506.2, 508.1, 508.2, 510.1, 510.2 and 526.1-526.8. D-FIFO 522.7-522.14 may be mapped to the vector registers IA IB, IC, ID, IE, IF, IG, and IH, respectively.

Inside the SB 500, the data input 502.1 may be coupled to the data outputs 506.1, 506.2, 508.1, 510.1 and 526.1 through 526.8. The data input 502.2 may be coupled to the data outputs 506.1, 506.2, 508.1, 508.2, 510.2 and 526.1 through 526.8. The data input 514.1 may be coupled to the data outputs 504.1-504.3, 506.1, 506.2, 508.1, 510.1, and 526.1 through 526.8. The data input 514.2 may be coupled to the data outputs 504.2, 504.3, 506.1, 506.2, 508.1, 508.2, 510.2 and 526.1 through 526.8. Each of the data inputs 524.1, 524.3, 524.5, and 524.7 may be coupled to the data outputs 504.1-504.3, 506.1, 506.2, 508.1, 510.1, and a corresponding one of outputs 526.1, 526.3, 526.5, and 526.7. Each of the data inputs 524.2, 524.4, 524.6, and 524.8 may be coupled to the data outputs 504.1-504.3, 506.1, 506.2, 508.1, 508.2, 510.2 and a corresponding one of outputs 526.2, 526.4, 526.6, and 526.8. For example, data input 524.1 may be coupled to 504.1-504.3, 506.1, 506.2, 508.1, 510.1, and 526.1, data input 524.2 may be coupled to 504.1-504.3, 506.1, 506.2, 508.1, 508.2, 510.2 and 526.2, etc. It should be noted that inside the SB 500, the coupling between an input and an output may be switched on (e.g., connected) or off (e.g., disconnected) based on a current configuration being applied at the SB 500. Moreover, D, E, and F ports of a PE may be for 2×M-bit configuration. Only higher M bits of register pairs (e.g., VB, IB, ID, IF, IH, and MB) may be assigned to D and F, and only lower M bits of register pairs (e.g., VA, IA, IC, IE, IG, and MA) may be assigned to E.

Each of the counters 520.1-520.27 at the data ports may be independently responsible for counting data passing through the data port. When one or more configurations may be loaded into the C-FIFO 518, each configuration may specify the number of executions (e.g., NUM_EXEC). During execution of one configuration, all counters may independently count the numbers of data passing through the data ports. When all the counters reach the number of executions specified in the configuration, the next configuration in the C-FIFO 518 may be applied.

A similar approach of using the counters may be applied inside a PE 118, and a memory port 120. Because these counters may facilitate configuration and reconfiguration of each component that may have such a counter, these counters may be referred to as reconfiguration counters and a component that has such a counter may be referred to as a reconfigurable unit. An embodiment of a processor 100 may provide massive parallel data processing using the various reconfigurable units and may be referred to as a reconfigurable parallel processor (RPP).

Figure 6:
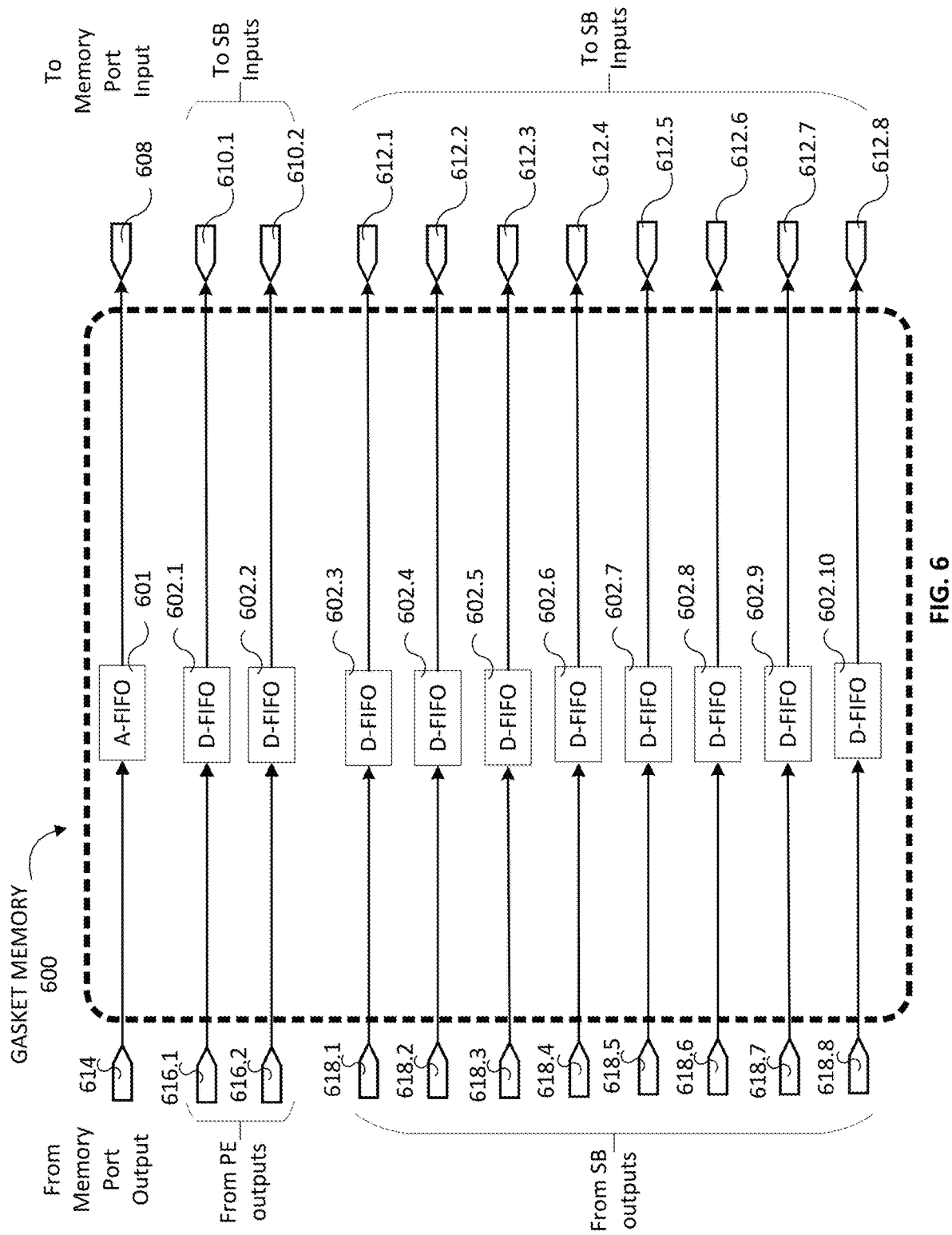
FIG. 6 schematically shows a gasket memory for a processor in accordance with an embodiment of the present disclosure.

FIG. 6 schematically shows a gasket memory 600 in accordance with an embodiment of the present disclosure. The gasket memory 600 may be an embodiment of the gasket memory 116 shown in FIG. 1. The gasket memory 600 may comprise a plurality of buffers for temporary storage of data and one buffer for address. The data buffers may be implemented as First-In-First-Out (FIFO) buffers and referred to as D-FIFOs (e.g., D-FIFO 602.1-602.10). The address buffer may be implemented as an address FIFO (e.g., A-FIFO 601). In addition, the gasket memory 600 may comprise a plurality of data inputs (e.g., 614, 616.1-616.2, and 618.1-618.8), and a plurality of data outputs (e.g., 608, 610.1-610.2, and 612.1-612.8).

The input 614 may be coupled to an output of MP 120.N and the output 608 may be coupled to an input of MP 120.1. Inside the gasket memory 600, the A-FIFO 601 may be coupled between the input 614 and output 608. The inputs 616.1 and 616.2 may be coupled to outputs 208.1 and 208.2 of PE 118.N, respectively. The outputs 610.1 and 610.2 may be coupled to inputs 514.1 and 514.2 of SB 122.1. Inside the gasket memory 600, the D-FIFO 602.1 may be coupled between the input 616.1 and output 610.1, and the D-FIFO 602.2 may be coupled between the input 616.2 and output 610.2. The inputs 618.1-618.8 may be coupled to outputs 526.1-526.8 of SB 122.N, respectively. The outputs 612.1-612.8 may be coupled to inputs 524.1-524.8 of SB 122.1, respectively. Inside the gasket memory 600, the D-FIFOs 602.3-602.10 may be coupled between the inputs 618.1-618.8 and outputs 612.1-612.8, respectively.

Figure 7:
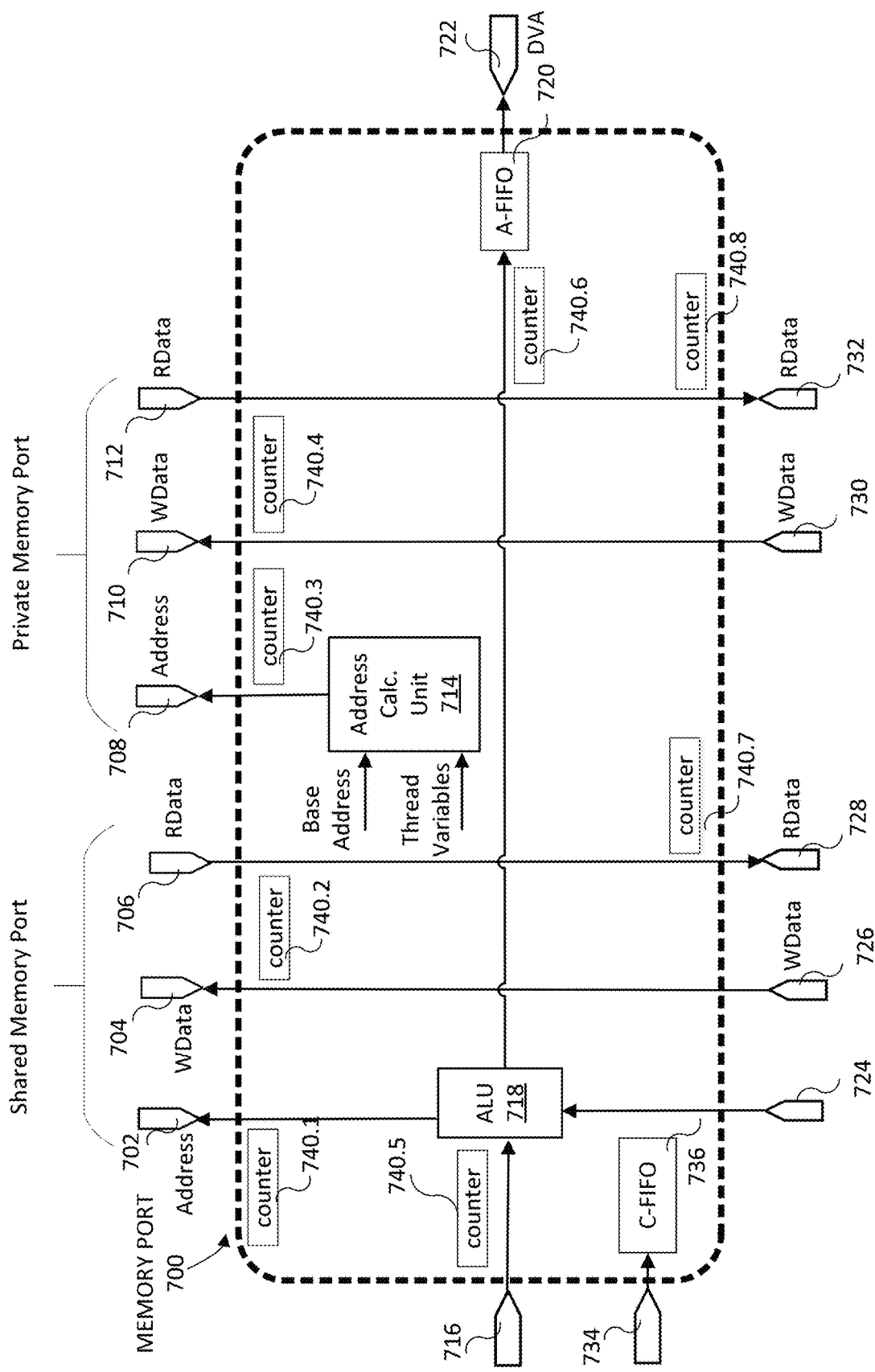
FIG. 7 schematically shows a memory port for a processor in accordance with an embodiment of the present disclosure.

FIG. 7 schematically shows a memory port 700 for a processor in accordance with an embodiment of the present disclosure. The memory port 700 may comprise an address port 702, a WData port 704 and a RData port 706 to be coupled to the address port 428, WData port 430 and RData port 432 of a shared memory access interface 402, respectively; an address port 708, a WData port 710 and a RData port 712 to be coupled to the address port 404, WData port 406 and RData port 408 of a private memory access interface 403, respectively; a data port 724, a WData port 726, a RData port 728, another WData port 730 and another RData port 732 to be coupled to the data ports 504.1, 504.2, 504.3, 502.1 and 502.2 of a SB 500, respectively.

The memory port 700 may further comprise a configuration input 734 and a configuration buffer (e.g., C-FIFO) 736. MP configurations may include instructions to be performed at a MP, for example, LOAD and STORE instructions to load data from the memory unit and to store data to the memory unit. The memory port 700 may further comprise an address input port 716, an ALU 718, an address buffer (e.g., A-FIFO) 720, and an address output port 722. The address input port 716 may be coupled to the address output port 722 of a MP of a preceding column (or the address output port 608 of the gasket memory 600 in case of MP 120.1), and the address output port 722 may be coupled to the address input port 716 of a MP of a succeeding column (or the address input port 614 of the gasket memory 600 in case of MP 120.N). The ALU 718 may perform operations on the addresses received from the address port 716 and the data received from the data port 724, and output the result addresses to the address port 702. Also, the ALU 718 may output the result addresses to the address port 722 or pass the addresses received from the address port 716 to the address port 722. The A-FIFO 720 may temporarily store the addresses from the ALU 718 before the addresses being output from the address port 722. The A-FIFO 720 may be mapped to the vector register DVA.

The memory port 700 may also comprise an address calculation unit 714. The address calculation unit 714 may be configured to generate memory addresses for private memory access using a base address and thread variables. The base address may be a starting memory address for data of a block (or a grid) of threads. The thread variables may include the block parameters, such as, but not limited to, the block (or grid) dimensions. The base address and thread variables may be delivered to the MP 700 in a MP configuration.

The memory port 700 may further comprise a plurality of counters 740.1-740.8. Each of the counters 740 may be associated with a data port or address port. Each of the counters 740.1-740.8 may be independently responsible for counting data passed the associated ports. For example, the counter 740.1 may be associated with the address port 702, the counter 740.2 may be associated with the WData port 704, the counter 740.3 may be associated with the address port 708, the counter 740.4 may be associated with the WData port 710, the counter 740.5 may be associated with the address input port 716, the counter 740.6 may be associated with the address output port 722, the counter 740.7 may be associated with the RData port 728, and the counter 740.8 may be associated with the RData port 732.

Figure 8:
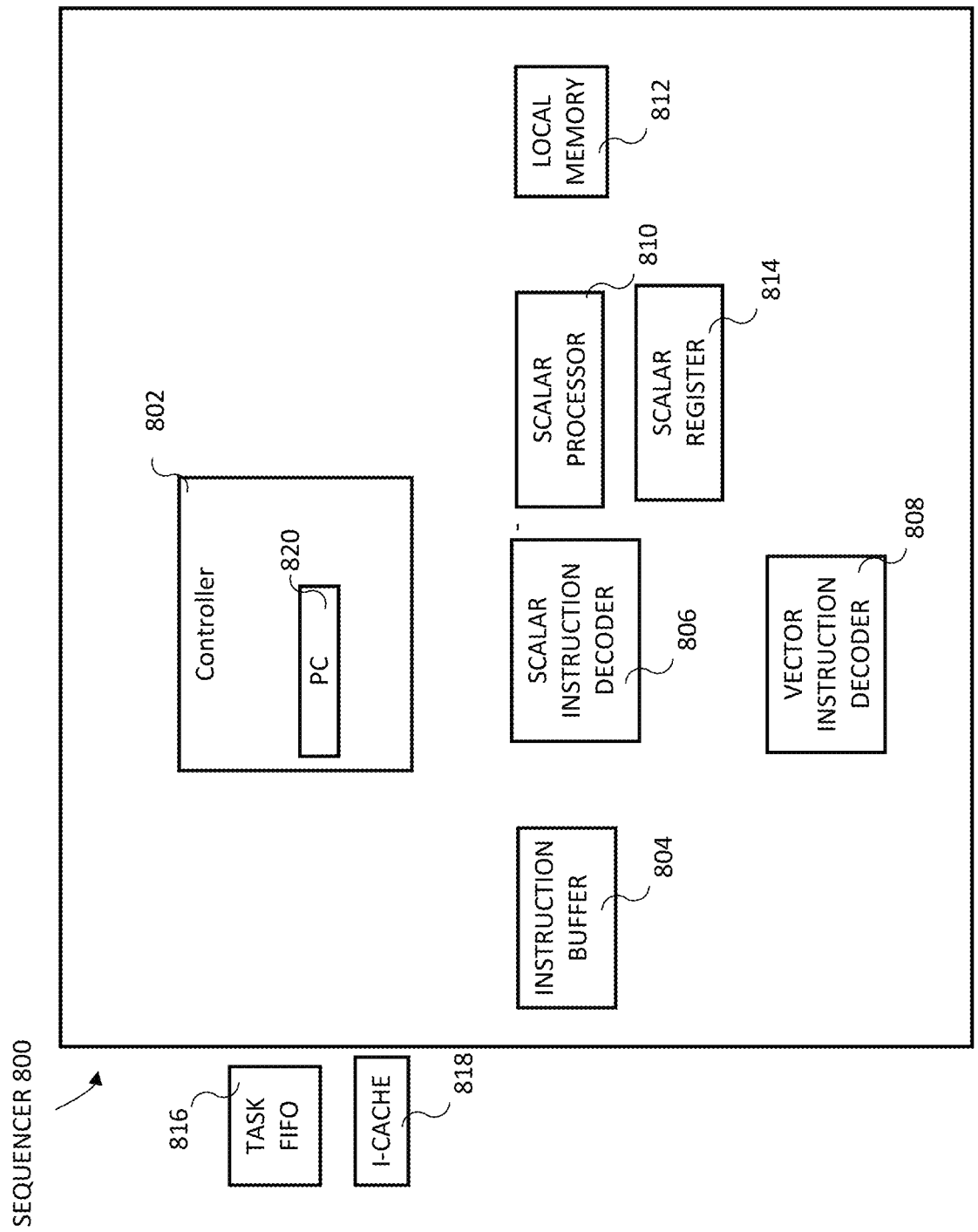
FIG. 8 schematically shows a sequencer for a processor in accordance with an embodiment of the present disclosure.

FIG. 8 schematically shows a sequencer 800 for a processor in accordance with an embodiment of the present disclosure. The sequencer 800 may be an embodiment of the sequencer 106 of FIG. 1, and may decode kernel programs, execute decoded scalar instructions, package decoded vector instructions into configurations and deliver the configurations to columns.

The sequencer 800 may be coupled to a task buffer (e.g., task FIFO) 816 and an instruction cache (e.g., i-Cache) 818. Information of a kernel such as base address of the program, job identifier (e.g., job ID), block identifier (e.g., block ID), and block indices may be transferred to the sequencer 800 via the task buffer 816. In one embodiment, the task buffer 816 and the instruction cache 818 may be part of the configuration memory 104 of FIG. 1. During operation, kernel information may be written to the task buffer 816 by external devices. When the task buffer 816 is not empty, the sequencer 800 may start processing a kernel after reading kernel information from the task buffer 816, then retrieve instructions from the instruction cache 818 for decoding, and stop when an end-of-program instruction is decoded. The sequencer 800 may be idle when the task buffer 816 is empty.

In some embodiments, the kernel information may include a bit to indicate whether the sequencer 802 should work in a continuous mode. If the bit is set, the sequencer 800 may continuously read kernel information from the task buffer 816 and fetch kernel programs. Otherwise, the sequencer 800 may monitor status of columns (e.g., of PE array 114) and wait until all columns become inactive before reading the next kernel information from the task buffer 816.

The sequencer 800 may comprise a controller 802, an instruction buffer 804, a scalar instruction decoder 806, a vector instruction decoder 808, a scalar processor 810, a local memory 812, and a scalar register 814. The controller 802 may fetch instructions from the instruction cache 818 and put the fetched instructions in the instruction buffer 804. In one embodiment, the instruction buffer 804 may be a circular buffer to hold a number of instructions (e.g., 64 or another number). During operation, for example, the controller 802 may fetch 64 instructions at the beginning of a kernel to fill the instruction buffer 804.

The fetched instructions may include scalar instructions and vector instructions mixed together. Certain bits of an instruction (e.g., the most significant 4 bits, the least significant four bits, or other bits) may specify a hardware unit designated to execute the instruction. The controller 802 may examine these bits and determine whether an instruction is a scalar instruction or a vector instruction based on the designated hardware unit.

The instruction buffer 804 may have an instruction pointer pointing to an instruction in the instruction buffer 804 as the next instruction to be processed. The next instruction to be processed may also be pointed to by a Program Counter (PC) 820 in the controller 802. The controller 802 may determine whether an instruction is a scalar instruction or a vector instruction, and direct scalar instructions to be sent to the scalar instruction decoder 806 and vector instructions to be sent to the vector instruction decoder 808. In some embodiments, the scalar instruction decoder 806 may decode one scalar instruction in one cycle and the vector instruction decoder 808 may decode a plurality of vector instructions in one cycle. For example, in one embodiment, the vector instruction decoder 808 may decode up to 8 vector instructions in one cycle. However, if a vector instruction refers one or more registers in the scalar register 814 and the one or more registers are not ready yet, wait cycles may be inserted. The PC 820 may be incremented by one when the scalar instruction decoder 806 decodes a scalar instruction. When the vector instruction decoder 808 decodes vector instructions, the PC 820 may be incremented by the number of decoded vector instructions.

The sequencer 800 may sequentially process instructions in the order stored in the instruction cache 818. Scalar instructions decoded by the scalar instruction decoder 806 may be executed on the fly by controller 802 and the scalar processor 810. Scalar instructions may generate parameters used to configure columns and manage loops and branches. The vector instruction decoder 808 may decode vector instructions to generate configurations for vector processing units. Vector instructions may configure data paths in columns, control data flow and process data in parallel threads. For example, vector instructions for the memory ports (e.g., MPs 120) may include memory access instructions, such as but not limited to, LOAD and STORE; vector instructions for the switch boxes (e.g., SBs 122) may include data copy instructions, such as but not limited to, MOVE and FORWARD; and vector instructions for the processing elements (e.g., PEs 118) may include arithmetic and logical instructions, such as but not limited to, ADD and SUBTRACT, etc.

In some embodiments, although a configuration may have one column as its destination or target column, configurations may be broadcasted to all columns. Each column may have a separate single line coupled to the sequencer for transmitting a valid bit. The scalar instruction decoder 806 may assert the valid bit to select a particular column when the configuration buffer of the selected column is not full. That is, when the configuration buffer of the selected column (e.g., configuration buffers of MP, PE, SB of the selected column) has available space, the valid bit for the selected column may be asserted for the configurations to be received by the selected column. When valid signals are not asserted, inputs of configuration buffers of the vector processing units may be tied to the ground to prevent logics in the vector processing units from toggling.

The configuration buffer size for the vector processing units may be larger than one configuration unit size so that there is no need for the sequencer 800 and columns to be synchronized. That is, each of the vector processing units may hold more than one configuration at any time and each column of vector processing units may execute decoded vector instructions in an asynchronous manner with respect to the sequencer 800. Therefore, the sequencer 800 may complete configuration dispatch before columns complete program execution. In at least one embodiment, the sequencer 800 may monitor whether columns are active or inactive but does not monitor which instructions columns are executing.

The destination column may be sequentially selected one at a time in the order of column number. Because the columns may be chained in a loop (e.g., MPs chained from MP 120.1 through 120.N then back to MP 120.1 via the gasket memory 116, SBs and PEs chained from SB 122.1 to PE 118.1 through SB 122.N to PE 118.N then back to SB 122.1 via the gasket memory 116), execution of a kernel program may select any column as a starting column. In one embodiment, the first column of the PE array 114 (e.g., the MP 120.1, SB 122.1, and PE 118.1) may be selected to start execution of a kernel program and other columns may be sequentially selected one at a time in the order of column number.

Kernel specific parameters may be set in the local memory 812 by external devices before the kernel is initiated. While executing some scalar instructions, the scalar processor 810 may read these parameters from local memory 812, process the parameters, and store the parameters in the scalar register 814. The scalar register 814 may be shared by the scalar processor 810 and vector instruction decoder 808. The vector instruction decoder 808 may obtain the kernel specific parameters from the scalar register 814 and deliver them to columns as immediate values in configurations. In addition, parameters (e.g., used to configure columns) generated by the scalar processor 810 executing scalar instructions may also be passed over to the vector instruction decoder 808 using the scalar register 814. In some embodiments, the scalar register 814 may comprise a plurality of registers. For example, in one embodiment, the scalar register 814 may comprise 32 16-bit registers denoted as R0 to R31.

The scalar processor 810 may comprise a scalar ALU and a Load/Store Unit. In one embodiment, the ALU may include an integer unit, a floating-point unit, a move unit, and a compare unit. Each of these units may be implemented in a multi-stage pipeline. The Load/Store Unit may also be implemented as multi-stage pipelines. The Load Unit may read data from the local memory 812 and store data in the scalar register 814. The Store Unit may write contents of the scalar register 814 to the local memory 812.

The scalar instructions decoded by the scalar instruction decoder 806 may include control flow instructions that may be executed by the controller 802. In some embodiments, the control flow instructions may include, but not limited to, repeat, jump, poll, and barrier instructions. A jump instruction is to change the execution flow from the next instruction in a current sequence of instructions to a destination instruction pointed by the jump instruction. A poll instruction is to let the controller 802 stop fetching instructions and wait until the DMA operation is done (e.g., DMA module 102 finishes). The poll instruction may synchronize the sequencer 800 and columns. When a barrier instruction is executed, the controller 802 may stop fetching instructions and wait until all columns become inactive. The barrier instruction may synchronize the sequencer 800 and columns.

Figure 9:
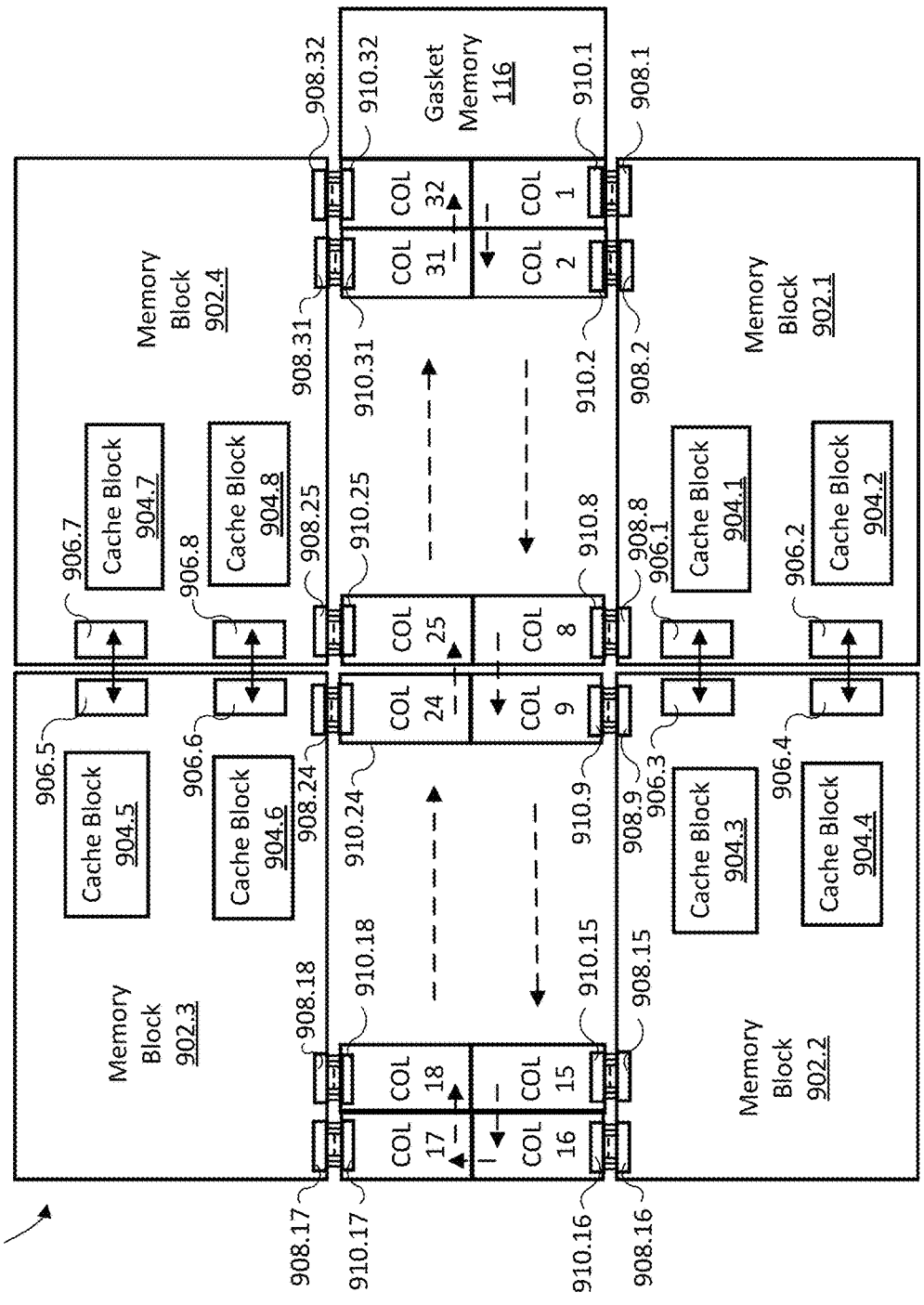
FIG. 9 schematically shows a floorplan for a processor in accordance with an embodiment of the present disclosure.

FIG. 9 schematically shows a floorplan 900 for the processor 100 in accordance with an embodiment of the present disclosure. In the floorplan 900, the columns 126.1 to 126.N of processor 100 may be denoted as COL 1 to COL 32, respectively, with N being 32. COL 1 to COL 32 may form a two-dimensional column array with a plurality of column stacks placed side-by-side in a first direction and each column stack having two columns stacked in a second direction. For example, COL 32 may be vertically stacked with COL 1, COL 31 may be vertically stacked with COL 2, and so on until COL 17 may be vertically stacked with COL 16, and column stacks are placed horizontally. It should be noted that columns stacked vertically and column stacks lined up horizontally as shown in FIG. 9 is just one example.

Each column may be coupled to two adjacent columns on either side in the first direction by data buses in-between with the exception of COL 1 and COL 32. The top columns COL 17 to COL 32 may have a left-to-right data flow while the bottom columns COL 1 to COL 16 may have a right-to-left data flow. The direction of the data flow may be indicated by dashed arrows. Therefore, COL 1 may be the preceding column of COL 2 and COL 3 may be the succeeding column of COL 2, and COL 2 may be coupled to COL 1 by data buses in-between and also coupled to COL 3 by data buses in-between. For the left-most stack, the bottom column COL 16 may connect directly to the top column COL 17 through data buses in-between. For other 15 stacks, the 2 columns inside the stack do not connect to each other.

The right-most column stack may interface with the gasket memory 116 and may maintain the same design and interface as the stacks other than the left-most stack. The gasket memory 116 may have its input ports coupled to output ports of COL 32 and output ports coupled to input ports of COL 1. The columns COL 1 to COL 32 and the gasket memory 116 may form a one-way circular data path, and the numbering of the columns also shows how the column indexing may increment in a circular fashion.

The memory unit 112 may be divided into two portions with the two portions placed by either side of two-dimensional column array in the second direction (e.g., top/down). As shown in FIG. 9, one portion on top of the column array may include memory blocks 902.1 and 901.2 placed side-by-side in the first direction (e.g., left/right), and the portion at the bottom of the column array may include memory blocks 901.3 and 901.4 placed side-by-side in the first direction. The memory block 902.1 may comprise cache blocks 904.1 and 904.2, the memory block 902.2 may comprise cache blocks 904.3 and 904.4, the memory block 902.3 may comprise cache blocks 904.5 and 904.6, and the memory block 902.4 may comprise cache blocks 904.7 and 904.8. For an embodiment of the memory unit 112 that may comprise 8 memory banks, such as the memory unit 300 with J being 8, each memory block may contain two memory banks and their corresponding memory caches. For example, the memory block 902.1 may comprise the memory banks 302.1 and 302.2, the cache block 904.1 may comprise memory caches 303.1 and 304.1 for memory bank 302.1, and the cache block 904.2 may comprise memory caches 303.2 and 304.2 for memory bank 302.2

Column stacks may be coupled to adjacent memory blocks by column stack to memory block interfaces 908.1 to 908.32 at the memory block side and 910.1 to 910.32 at the column stack side with each column stack coupled to one memory block at the top and to another memory block at the bottom. For example, the column stack of COL 32 and COL 1 may be coupled to the memory block 902.1 at bottom by column stack to memory block interface 908.1 at memory block side and 910.1 at the column stack side, at the same time, the column stack of COL 32 and COL 1 may be coupled to the memory block 902.4 at top by column stack to memory block interface 908.32 at memory block side and 910.32 at the column stack side. Similarly, the column stack of COL 31 and COL 2 may be coupled to the memory block 902.1 by interfaces 908.2 and 910.2, and to the memory block 920.4 by interfaces 908.31 and 910.31; the column stack of COL 25 and COL 8 may be coupled to the memory block 902.1 by interfaces 908.8 and 910.8, and to the memory block 920.4 by interfaces 908.25 and 910.25; the column stack of COL 24 and COL 9 may be coupled to the memory block 902.2 by interfaces 908.9 and 910.9, and to the memory block 920.3 by interfaces 908.24 and 910.24; the column stack of COL 18 and COL 15 may be coupled to the memory block 902.2 by interfaces 908.15 and 910.15, and to the memory block 920.3 by interfaces 908.18 and 910.18; and the column stack of COL 17 and COL 16 may be coupled to the memory block 902.2 by interfaces 908.16 and 910.16, and to the memory block 920.3 by interfaces 908.17 and 910.17.

Two adjacent memory blocks may also be coupled by a pair of interfaces. For example, the memory block 902.1 may be coupled to the memory block 902.2 by interfaces 906.1 and 906.2 at the memory block 902.1 and interfaces 906.3 and 906.4 at the memory block 902.2. Also, the memory block 902.3 may be coupled to the memory block 902.4 by interfaces 906.5 and 906.6 at the memory block 902.3 and interfaces 906.7 and 906.8 at the memory block 902.4.

It should be noted that a memory interface may refer to a MI 124, a memory access interface may refer to a private memory access interface 403 or a shared memory access interface 402, and the generic term interface may refer to the wiring of connections and arrangement of wiring connections between components.

Although not shown in the floorplan 900, the sequencer 106 and other components of the processor 100 may be grouped together into a scalar unit block and placed on one side (e.g., top, down, left or right). In one embodiment, it may be combined with the gasket memory 116 and placed at the far-right side. There may be routing channels between the column stacks and memory blocks in the second direction (e.g., horizontal). As used herein, a routing channel may refer to a strip of silicon area dedicated to wiring connections. For example, control signals and configurations from the sequencer 106 may be routed through these horizontal routing channels and connection pins may be placed on the top (COL 17 to COL 32) and bottom (COL 1 to COL 16) boundary of both the column stacks and the scalar unit block to access the horizontal routing channels. For the memory blocks, the pins for the control signals may be placed at the top for memory blocks at the bottom, and at the bottom for memory blocks at the top. It should be noted that, depending on the distance from the scalar unit, zero, one or more pipeline delay stages (e.g., FIFO buffers), or simply delay stages or stages may be implemented for some control and configuration signal lines. For example, for COL 1 and COL 2, there are no stages; for COL 3 to COL 4, 1 stage may be inserted; for COL 5 to COL 7, 2 stages may be inserted; for COL 8 to COL 10, 3 stages may be inserted; for COL 11 to COL 13, 4 stages may be inserted; for COL 14 to COL 16, 5 stages may be inserted.

Figure 10:
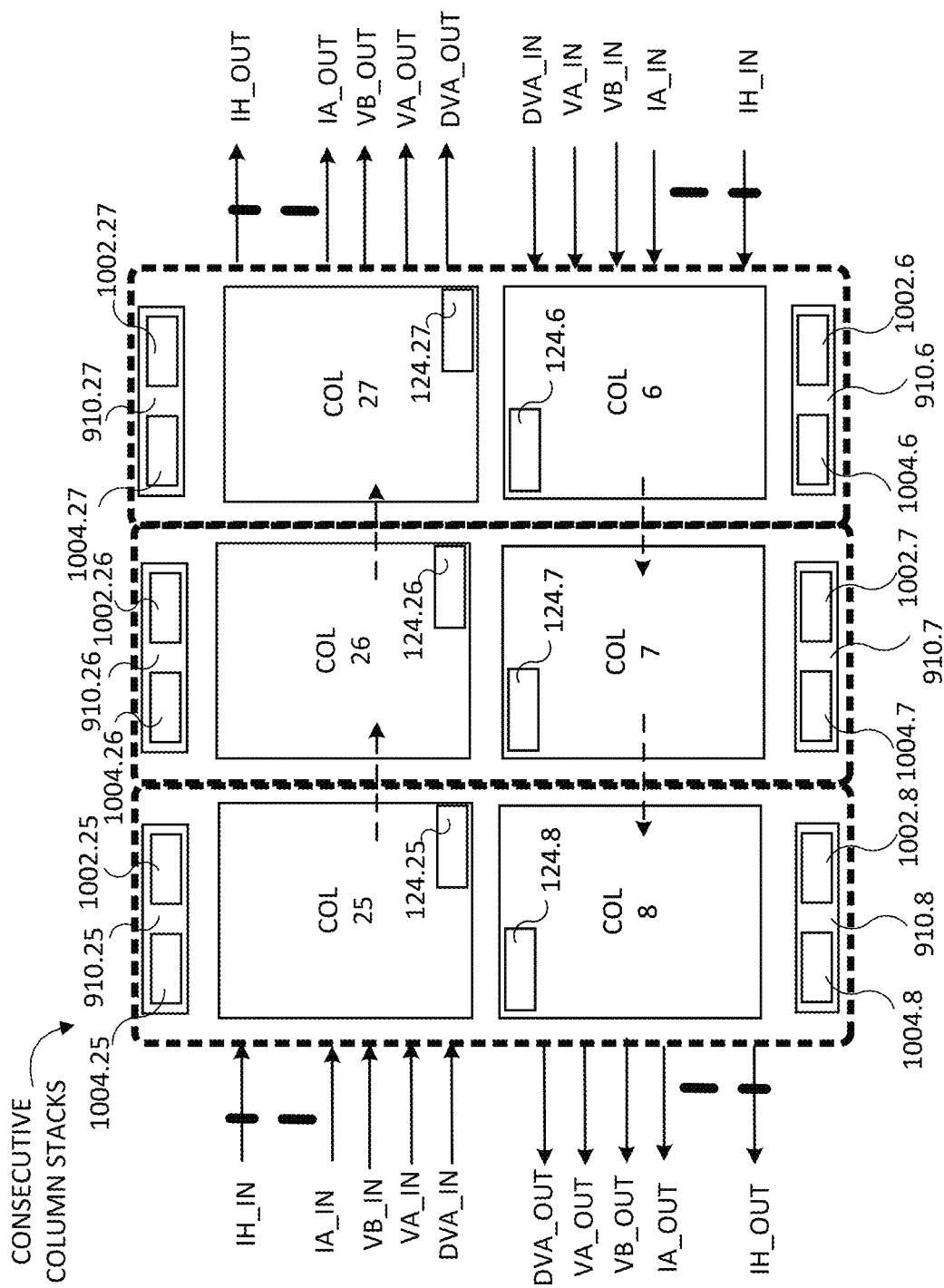
FIG. 10 schematically shows three consecutive column stacks in accordance with an embodiment of the present disclosure.

FIG. 10 schematically shows three consecutive column stacks in accordance with an embodiment of the present disclosure. The three consecutive column stacks may comprise one column stack of COL 27 and COL 6, another column stack of COL 26 and COL 7, and yet another column stack of COL 25 and COL 8. Each column may have two column-to-column interfaces. With the exception of COL 1 and COL 32, one of such column-to-column interfaces is coupled to a preceding column and another coupled to a succeeding column. Each of COL 1 and COL 32 may have one of such column-to-column interfaces coupled to the gasket memory. Each column-to-column interface may have 11 buses going in or 11 buses going out.

The 11 buses may be denoted as VA, VB, IA, IB, IC, ID, IE, IF, IG, IH, and DVA. As inputs VA_IN, VB_IN, IA_IN, IB_IN, IC_IN, ID_IN, IE_IN, IF_IN, IG_IN and IH_IN, the first 10 buses may feed directly into the SB of the column (e.g., to the input ports 514.1, 514.2 and 524.1-524.8 of the SB 500, respectively). The signals may be fed into functional logic in the SB and depending on the column configuration set by the sequencer 106, distributed to the succeeding column, to the MP (and eventually MI and memory caches), or to the PE for arithmetic operations. The last bus, DVA, may be a dedicated address bus for MP inputs (e.g., DVA_IN for input 716 of the MP 700) that may also be fed directly to the succeeding column depending on configuration. As outputs DVA_OUT, VA_OUT, VB_OUT, IA_OUT, IB_OUT, IC_OUT, ID_OUT, IE_OUT, IF_OUT, IG_OUT and IH_OUT, the DVA address bus may be coupled from the output 722 of the MP 700, and other 10 buses may be coupled from the outputs 208.1 and 208.2 of the PE 200, and outputs 526.1 to 526.8 of SB 500, respectively.

It should be noted that FIG. 10 shows the VA, VB, IA, IB, IC, ID, IE, IF, IG, IH, and DVA buses for illustration of bus names, not physically location. In some embodiments, the V* buses (e.g., VA and VB) and I* buses (e.g., IA, IB, IC, ID, IE, IF, IG and IH) may be bit-aligned and interspersed along the column edge. For example, SB may include bit-wise muxing logic circuits, bits IA_0[0], IB_0[0], etc. may be fed into the same functional logic, and bits IA_0[1], IB _0[1], etc. may be fed into a different functional logic, with _* referring to the indexing of a vector element of the bus and [*] referring to bit indexing of the vector element. Therefore, these 10 buses (e.g., two V* buses and 8 I* buses) may be arranged in an interleaving pin-placement pattern. For example, in FIG. 10, for the upper columns, "VA" is not really below "VB". They are overlapping, lined up bit-by-bit. Moreover, to minimize routing, each column stack may be physically abutted with pins aligned to avoid any additional routing in a column stack. For example, IA_IN_0[0] and IA_OUT_0[0] for one column may have identical γ-coordinate on opposite sides of a column stack.

In the left-most stack with COL 16 and COL 17, each bus may need to route vertically to connect the lower column (COL 16) and upper column (COL 17) within the stack. To balance vertical distance between every bit, the bit and bus order may increment in the same direction for both COL 16 and COL 17, as opposed to a mirrored approach. For example, in COL 17, suppose VA output bits from lower to higher are arranged like VA_OUT[0], VA_OUT[1], and moving upwards until ending with VA_OUT[n]. Thus, for COL 16, VA input bits may be arranged from top to bottom as VA_IN[n], VA_IN[n−1], and moving downwards until ending with VA_IN[0]. Therefore, vertical distance between VA_IN[n] of COL 16 and VA_OUT[n] of COL 17 may be the same for all values of n. It should be noted that VB_IN bits may be interleaved with VA_IN bits for COL 16 in the same bit order, and VB_OUT bits may be interleaved with VA_OUT bits for COL 17 in the same bit order. Also, the I* buses may be arranged in the same bit-aligned and incremental bit order to have balanced vertical distance for all their bits.

In some embodiments, the DVA bus is not bit-aligned with any other buses. The DVA bus, however, may also have the bits aligned incremental in the same direction for both COL 16 and COL 17. For example, in COL 17, suppose DVA output bits from lower to higher are arranged like DVA_OUT[0], DVA_OUT[1], and moving upwards until ending with DVA_OUT[n]. Thus, for COL 16, DVA input bits may be arranged from top to bottom as DVA_IN[n], DVA_IN[n−1], and moving downwards until ending with DVA_IN[0]. Therefore, vertical distance between DVA[n] and DVA[n] is the same for all values of n.

In the processor 100, each column may have direct access to the memory unit 112, and thus, each column may have direct connections to memory blocks at the top and at the bottom. FIG. 10 may illustrate that the column stack to memory block interfaces 910.1 to 910.32 at the column stack side may each comprise two sections 1002.*x* and 1004.*x* for the two columns in the column stack. The number "x" may match the labeling index of the column stack to memory block interfaces 910. For example, the column stack to memory block interface 910.6 at the column stack side may comprise two sections 1002.6 and 1004.6, the column stack to memory block interface 910.7 at the column stack side may comprise two sections 1002.7 and 1004.7, the column stack to memory block interface 910.8 at the column stack side may comprise two sections 1002.8 and 1004.8, the column stack to memory block interface 910.25 at the column stack side may comprise two sections 1002.25 and 1004.25, the column stack to memory block interface 910.26 at the column stack side may comprise two sections 1002.26 and 1004.26, and the column stack to memory block interface 910.27 at the column stack side may comprise two sections 1002.27 and 1004.27.

Each section of a column stack to memory block interface 910 may be an interface for one column in the respective column stack to access the memory blocks at the top (e.g., memory blocks 902.1 and 902.2) or at the bottom (e.g., memory blocks 902. and 902.4). For example, section 1004.6 may be for COL 6 to access memory blocks at the bottom, and section 1002.6 may be for COL 27 to access memory blocks at the bottom, while section 1004.27 may be for COL 6 to access memory blocks at the top, and section 1002.27 may be for COL 27 to access memory blocks at the top. Section 1004.7 may be for COL 7 to access memory blocks at the bottom, and section 1002.7 may be for COL 26 to access memory blocks at the bottom, while section 1004.26 may be for COL 7 to access memory blocks at the top, and section 1002.26 may be for COL 26 to access memory blocks at the top. And section 1004.8 may be for COL 8 to access memory blocks at the bottom, and section 1002.8 may be for COL 25 to access memory blocks at the bottom, while section 1004.25 may be for COL 8 to access memory blocks at the top, and section 1002.25 may be for COL 25 to access memory blocks at the top.

Inside a column stack, both memory interfaces 124 (e.g., one for each of the two columns) may be coupled to the memory blocks on both sides (vertically) of the column stack and the functional logic in each MI 124 may need to drive the data and address buses to both the upper and lower memory blocks. Therefore, in some embodiments, the memory interfaces 124 may be placed near the middle (vertically) of the column stack such that the MI to Cache Block interface routing may be balanced for both columns in both directions. For example, in column 8, the MI 124.8 may be placed close or at the top of column 8, while in the same column stack, in column 25, the MI 124.25 may be placed close or at the bottom of column 25. Similarly, in column 7, the MI 124.7 may be placed close or at the top of column 7 while in column 26, the MI 124.26 may be placed close or at the bottom of column 26; and in column 6, the MI 124.6 may be placed close or at the top of column 6 while in column 27, the MI 124.27 may be placed close or at the bottom of column 27.

Figure 11:
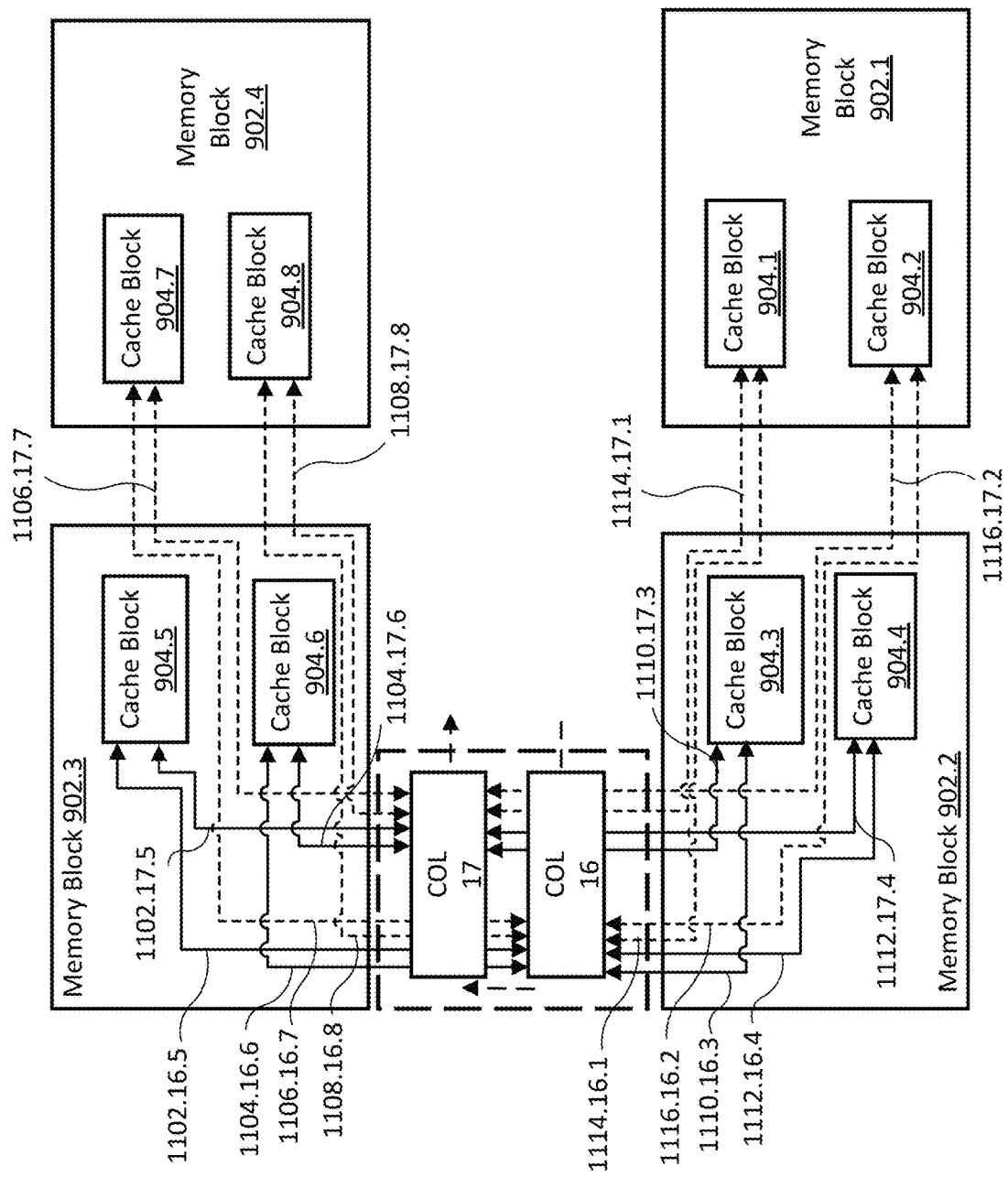
FIG. 11 schematically shows connections to memory blocks for two columns in a column stack in accordance with an embodiment of the present disclosure.

FIG. 11 schematically shows wiring to memory blocks for two columns in a column stack in accordance with an embodiment of the present disclosure. All columns interface with all memory caches via MIs 124.1 to 124.N as shown FIG. 3. Embodiments try to implement physical routing of the buses efficiently, without wasting area and power. In some embodiments, the buses from all 32 columns to all 8 cache blocks 9041.1-904.8 may be distributed to utilize space within the column stacks and memory blocks by feedthrough routing. This may avoid area-expensive external routing channels which would not be efficiently filled with logic. Given the centralized column floorplan, there are two main feedthrough implementations, one in column stacks and one in memory blocks. As used herein, feedthrough may refer to passing through without making electrical contacts with functional logic of a component. For example, a feedthrough signal wire may have one or more pipeline stages (e.g., FIFO) in a memory block but does not have any electrical connection to functional logic circuitry of the memory block.

Within a column stack, each of the two columns may have 4 interfaces for cache blocks at the top and another 4 interfaces for cache blocks at the bottom. For example, as shown in FIG. 11, at the top, COL 16 may be coupled to the cache block 904.5 by a bi-directional wiring connection 1102.16.5, to the cache block 904.6 by a bi-directional wiring connection 1104.16.6, to the cache block 904.7 by a bi-directional wiring connection 1106.16.7 and to the cache block 904.8 by a bi-directional wiring connection 1108.16.8; and COL 17 may be coupled to the cache block 904.5 by a bi-directional wiring connection 1102.17.5, to the cache block 904.6 by a bi-directional wiring connection 1104.17.6, to the cache block 904.7 by a bi-directional wiring connection 1106.17.7 and to the cache block 904.8 by a bi-directional wiring connection 1108.17.8. At the bottom, COL 16 may be coupled to the cache block 904.1 by a bi-directional wiring connection 1114.16.1, to the cache block 904.2 by a bi-directional wiring connection 1116.16.2, to the cache block 904.3 by a bi-directional wiring connection 1110.16.3 and to the cache block 904.4 by a bi-directional wiring connection 1114.16.4; and COL 17 may be coupled to the cache block 904.1 by a bi-directional wiring connection 1114.17.1, to the cache block 904.2 by a bi-directional wiring connection 1116.17.2, to the cache block 904.3 by a bi-directional wiring connection 1110.17.3 and to the cache block 904.4 by a bi-directional wiring connection 1112.17.4.

As used herein, a wiring connection may refer to electrical wirings for signal, data or both between two components and may include many electrical signal lines. The wiring connection may be implemented by connecting an interface of the one component to another interface of another component. Bi-directional connection may be implemented by one set of wiring connection for signal to be transmitted in one direction and another set of wiring connection for signals to be transmitted in the opposite direction. To avoid littering FIG. 11 with many reference numerals, the wiring connections may also be used to refer to an interface of a component that makes the wiring connection. Thus, COL 16 may have four interfaces 1114.16.1, 1116.16.2, 1110.16.3 and 1112.16.4 for cache blocks 904.1, 904.2, 904.3 and 904.4 at the bottom, respectively. Also, COL 16 may have four interfaces 1102.16.5, 1104.16.6, 1106.16.7 and 1108.16.8 for cache blocks 904.5, 904.6, 904.7 and 904.8 at the top, respectively. And COL 17 may have four interfaces 1114.17.1, 1116.17.2, 1110.17.3 and 1112.17.4 for cache blocks 904.1, 904.2, 904.3 and 904.4 at the bottom, respectively; and may also have four interfaces 1102.17.5, 1104.17.6, 1106.17.7 and 1108.17.8 for cache blocks 904.5, 904.6, 904.7 and 904.8 at the top, respectively. Note that the first index number for an interface may refer to the column (e.g., 16 corresponding to COL 16) and the second index number may refer to the cache block (e.g., 1 corresponding to 904.1, 2 corresponding to 904.2, etc.).

Inside each column stack, the column at the bottom may be coupled to cache blocks at the top by feedthrough routing through the column at the top, and the column at the top may be coupled to cache blocks at the bottom by feedthrough routing through the column at the bottom. For example, because COL 17 is on top of COL 16, interfaces of COL 16 to the cache blocks at the top may feedthrough COL 17 (e.g., bi-directional wiring connections 1102.16.5, 1104.16.6, 1106.16.7 and 1108.16.8 passing through COL 17 without making any contacts to COL 17 and shown as obscured by COL 17 in FIG. 11) and interfaces of COL 17 to the cache blocks at the bottom may feedthrough COL 16 (e.g., bi-directional wiring connections 1114.17.1, 1116.17.2, 1110.17.3 and 1112.17.4 passing through COL 16 without making any contacts to COL 16 shown obscured by COL 16 in FIG. 11).

Within a memory block, there may be 64 interfaces for making wiring connections to all 32 columns. As an example, for the bottom portion, FIG. 11 shows that the memory block 902.2 may have interfaces 1110.16.3 and 1110.17.3 for cache block 904.3 to be coupled to COL 16 and COL 17, respectively; and interfaces 1112.16.4 and 1112.17.4 for cache block 904.4 to be coupled to COL 16 and COL 17, respectively. Also, the memory block 902.1 may have interfaces 1114.16.1 and 1114.17.1 for cache block 904.1 to be coupled to COL 16 and COL 17, respectively; and interfaces 1116.16.2 and 1116.17.2 for cache block 904.2 to be coupled to COL 16 and COL 17, respectively. Moreover, for the top portion, FIG. 11 shows that the memory block 902.3 may have interfaces 1102.16.5 and 1102.17.5 for cache block 904.5 to be coupled to COL 16 and COL 17, respectively; and interfaces 1104.16.4 and 1104.17.6 for cache block 904.6 to be coupled to COL 16 and COL 17, respectively. Also, the memory block 902.4 may have interfaces 1106.16.7 and 1106.17.7 for cache block 904.7 to be coupled to COL 16 and COL 17, respectively; and interfaces 1108.16.8 and 1108.17.8 for cache block 904.8 to be coupled to COL 16 and COL 17, respectively.

Each memory block may also implement feedthrough routing for columns at the left to access memory blocks at the right, and for columns at the right to access memory blocks at the left. Referring back to FIG. 9, in the floorplan 900, the center may be between memory blocks 902.3 and 902.4 at the top, between the column stack of COL 24 and COL 9 and the column stack of COL 25 and COL 8 in the middle, and between memory blocks 902.1 and 902.2 at the bottom. Therefore, the floorplan 900 shows that COL 9 to COL 24 and memory blocks 902.2 and 902.3 may be positioned at the left, and COL 1 to COL 8 and COL 25 to COL 32 and memory blocks 902.1 and 902.4 may be positioned at the right. As an example, for feedthrough routing in memory blocks, in FIG. 11, solid lines for wiring connections 1110.16.3, 1112.16.4, 1110.17.3 and 1112.17.4 may indicate that these wiring connections may be coupled to interfaces within the memory block 902.2, while dotted lines for wiring connections 1114.16.1, 1114.17.1, 1116.16.2 and 1116.17.2 may indicate that these wiring connections may feedthrough the memory block 902.2 and be coupled to interfaces within the memory block 902.1. Also, solid lines for wiring connections 1102.16.5, 1102.17.5, 1104.16.6 and 1104.17.6 may indicate that these wiring connections may be coupled to interfaces within the memory block 902.3, while dotted lines for wiring connections 1106.16.7, 1106.17.7, 1108.16.8 and 1108.17.8 may indicate that these wiring connections may feedthrough the memory block 902.3 and be coupled to interfaces within the memory block 902.4.

It should be noted that in some embodiments, a memory block may be implemented in one functional logic block (e.g., in hardware description language, such as VERILOG), and a column stack may also be implemented in one functional logic block. Connections between these functional logic blocks may be implemented by placing pins at the boundaries of the functional logic blocks and connecting these pins be electrical connections. Referring back to FIG.

10, sections 1002 and 1004 of a column stack to memory block interface 910 at the column stack side and a corresponding interface 908 may comprise pins for the wiring connections 1102, 1104, 1106, 1108, 1110, 1112, 1114 and 1116 to connect through. For example, wiring connections 1102.16.5, 1104.16.6, 1106.16.7 and 1108.16.8 may be connected through pins of section 1004.17 of interface 910.17 and corresponding pins of 908.17; wiring connections 1102.17.5, 1104.17.6, 1106.17.7 and 1108.17.8 may be connected through pins of section 1002.17 of interface 910.17 and corresponding pins of 908.17; wiring connections 1114.16.1, 1116.16.2, 1110.16.3, 1112.16.4 may be connected through pins of section 1004.16 of interface 910.16 and corresponding pins of 908.16; wiring connections 1114.17.1, 1116.17.2, 1110.17.3, 1112.17.4 may be connected through pins of section 1002.16 of interface 910.16 and corresponding pins of 908.16.

Also, there may be pins at the boundary between neighboring memory blocks, for example, the interfaces 906.1 and 906.3 may comprise pins for wiring connections 1114.16.1 and 1114.17.1 to connect through, the interfaces 906.2 and 906.4 may comprise pins for wiring connections 1114.16.2 and 1114.17.2 to connect through, the interfaces 906.5 and 906.7 may comprise pins for wiring connections 1106.16.7 and 1106.17.7 to connect through, and the interfaces 906.6 and 906.8 may comprise pins for wiring connections 1108.16.8 and 1108.17.8 to connect through.

It should be noted that the wiring connections for one column coupled to all 8 cache blocks may include connections for the data ports 422.1-422.J, 424.1-424.J, and address ports 426.1-426.J for the shared memory access interface 402 and data ports 412.1-412.J, 414.1-414.J, and address ports 410.1-410.J for the private memory access interface 403.

In some embodiments, because of the size of the column stacks and memory blocks, it may be hard for all signals to traverse the interfaces in a single cycle. In at least one embodiment, delay stages may be placed between the column boundary and the boundary of a cache block (e.g., the boundary of the registers in the cache blocks) in the wiring connections. For example, each of the wiring connections 1114.16.1, 1116.16.2, 1110.16.3, 1112.16.4, 1114.17.1, 1116.17.2, 1110.17.3 and 1112.17.4 may have one or more delay stages (e.g., FIFO buffers) inside the memory block 902.2, and each of the wiring connections 1102.16.5, 1104.16.6, 1106.16.7, 1108.16.8, 1102.17.5, 1104.17.6, 1106.17.6 and 1108.17.8 may have one or more delay stages inside the memory block 902.3.

Figure 12:
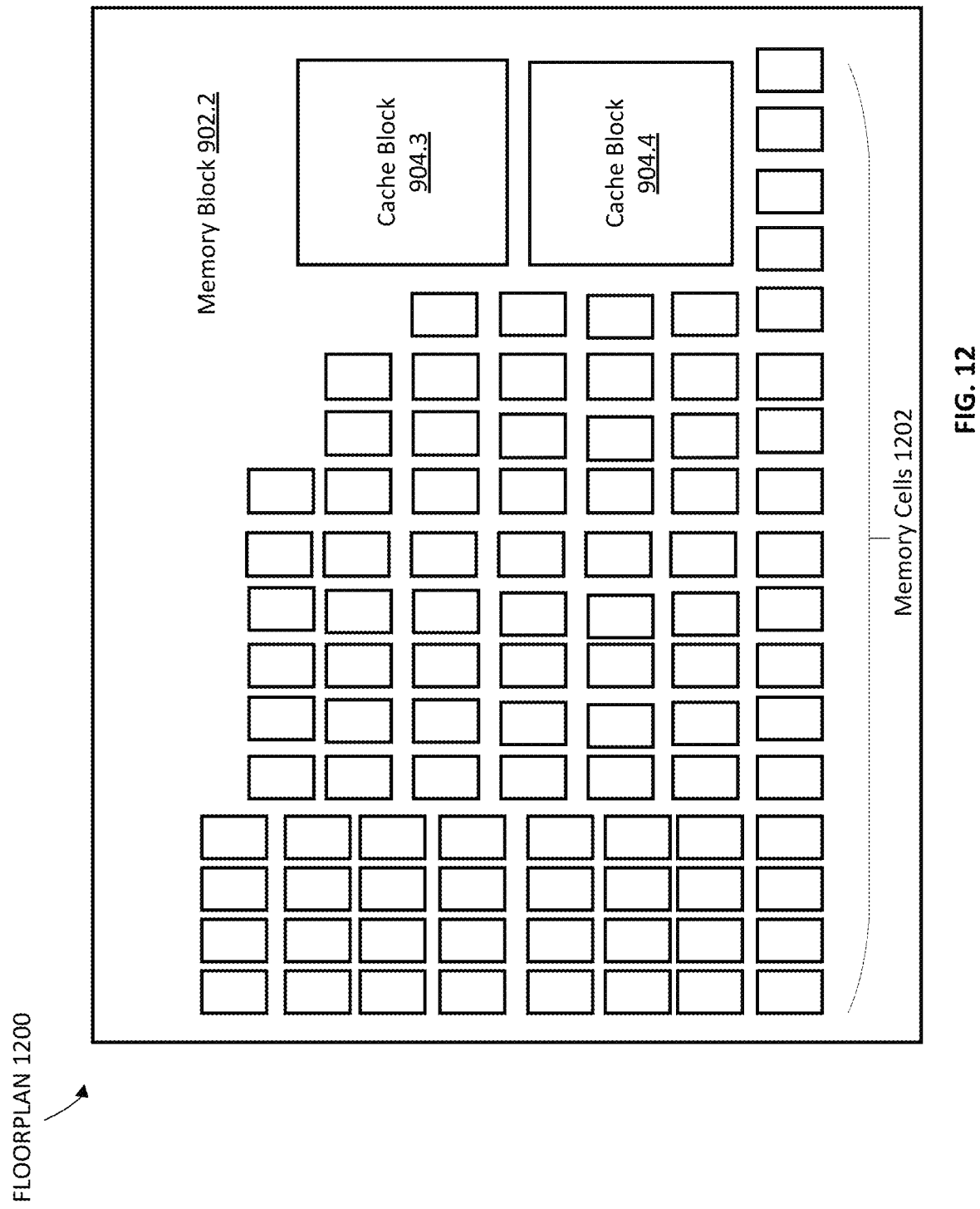
FIG. 12 schematically shows a floorplan of a memory block in accordance with an embodiment of the present disclosure.

FIG. 12 schematically shows a floorplan 1200 for the memory block 902.2 in accordance with an embodiment of the present disclosure. Because all 32 columns are connected to all 8 cache blocks 904.1-904.8, the cache blocks may be placed as close to the center of the column array as possible. Therefore, the cache block 904.3 and cache block 904.4 may be placed along the right vertical edge of the memory block 902.2 in the floorplan 1200. The memory block 902.2 may comprise a plurality of memory cells 1202. Some cells of the plurality of memory cells 1202 may form the memory bank 302.3 and other cells of the plurality of memory cells 1202 may form the memory bank 302.4. In some embodiments, each memory bank may have two groups of physical memory banks (e.g., 8 even groups and 8 odd groups) and each physical memory bank may have three memory cells.

In one embodiment, each of the memory cells 1202 may be a hardened SRAM cell in existing technology. For example, each of the memory cells 1202 may be a High-Speed ARM SRAM cell of depth 8192 words with bit width of 64, and the exemplary memory block 902.2 shown in FIG. 12 may have 48 memory cells for memory bank 302.3 (accessed via the cache block 904.3) and another 48 memory cells for memory bank 302.4 (accessed via the cache block 904.4). Therefore, the memory unit 112 may contain four of such memory blocks with a total size 24 MB.

The memory cells 1202 may be distributed in an area away from the edge abutting the column array (e.g., top edge) and the edge abutting the neighboring memory block (e.g., right edge). The space between the memory cells and the edge abutting the neighboring memory block may be used for the cache blocks (e.g., 904.3 and 904.4). The space between the memory cells and the edge abutting the column array may be used as routing channels. For example, data buses and address buses for wiring connections between the columns and cache blocks may be positioned in the space between the memory cells 1202 and the top edge of the memory block 902.2.

The space between the memory cells may also be used as routing channels. The memory cells furthest from the cache blocks may need the least amount of routing channel resources because the traffic becomes heavier when it gets closer to the cache blocks. Moreover, the densest logic may reside in the cache blocks. Therefore, the routing channels furthest from the cache blocks may have the smallest routing channels. When it is closer to the cache blocks, the space between memory cells and the edge abutting the column array may become larger (e.g., on top of the memory cells and below the column array in FIG. 12) and the space among the memory cells may also become larger.

In some embodiments, the memory bank logic and connection between the memory bank logic and physical memory banks may be placed in the space between the memory cells. Moreover, interfaces between the columns and cache blocks, including feedthrough interfaces and pipeline registers, may also be implemented in the routing channels between memory cells. By efficiently utilizing the area in-and-around the memory cells, an exemplary processor 100 may reduce dynamic switching power consumption and remove the need for dedicated routing channels for synchronous interfaces.

In some embodiments, the vertical routing channel widths may be configured separately from horizontal routing channel widths to support unbalanced metal stacks. Moreover, in some embodiments, the processor 100 may be manufactured by multi-layer semiconductor technology and may include routing on higher layers over the top of memory cells. In one embodiment, a minimum routing channel width may be set to 20 um, and the width of routing channels may be incremented with the minimum channel width as the incremental unit.

Figure 13:
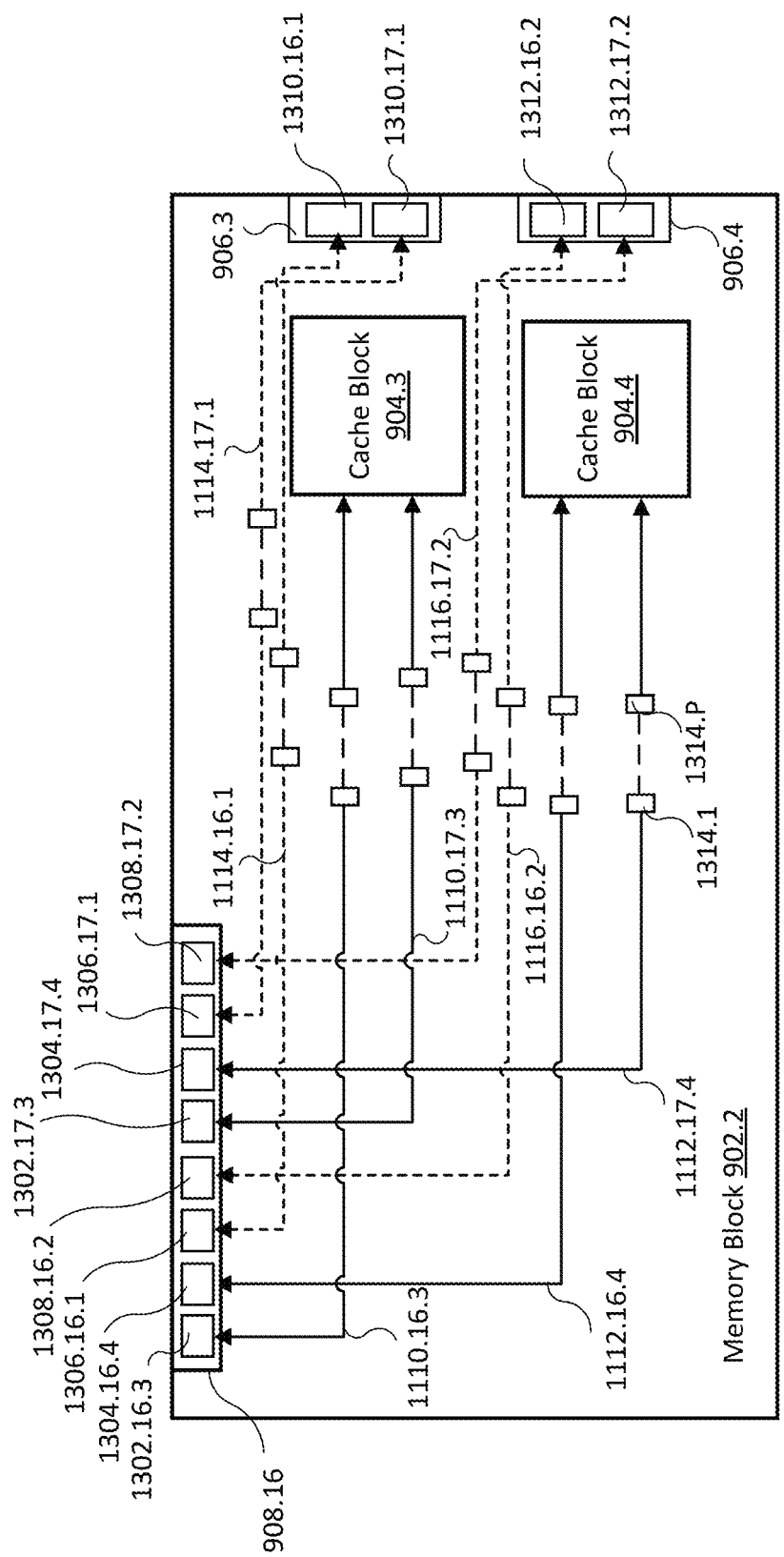
FIG. 13 schematically shows arrangement of wiring connections between columns and cache blocks on the boundaries of a memory block in accordance with an embodiment of the present disclosure.

FIG. 13 schematically shows arrangement of wiring connections between columns and cache blocks on the boundaries of the memory block 902.2 in accordance with an embodiment of the present disclosure. The interfaces 908 in a memory block may be positioned on a first edge of the memory block facing the column stacks (e.g., top edge in the floorplan 1200) and the interfaces 906 in a memory block may be positioned on a second edge of the memory block facing the adjacent memory block (e.g., right edge in the floorplan 1200). The first edge may interface with the column stacks and may be referred to as the "source" edge of the memory block. The second edge may interface with the adjacent memory block to let feedthrough signals pass through and may be referred to as the "mirror" edge of the memory block. The interface 908.16 may be shown as the example of an interface on the source edge and may be the interface for columns 16 and 17 to be coupled to the memory block 902.2. The interfaces 906.3 and 906.4 may be shown as the example of interfaces on the mirror edge and may be the interfaces coupling the memory block 902.2 to its adjacent memory block 902.1 for feedthrough signals passing through the memory block 902.2 to the memory block 902.1 and feedthrough signals passing through the memory block 902.1 to the memory block 902.2.

The interface 908.16 may comprise, from left to right, a pin group 1302.16.3 for the wiring connection 1110.16.3, a pin group 1304.16.4 for the wiring connection 1112.16.4, a pin group 1306.16.1 for the wiring connection 1114.16.1, a pin group 1308.16.2 for the wiring connection 1116.16.2, a pin group 1302.17.3 for the wiring connection 1110.17.3, a pin group 1304.17.4 for the wiring connection 1112.17.4, a pin group 1306.17.1 for the wiring connection 1114.17.1, a pin group 1308.17.2 for the wiring connection 1116.17.2. The interface 906.3 may comprise, from top to bottom, a pin group 1310.16.1 for the feedthrough wiring connection 1114.16.1 and a pin group 1310.17.1 for the feedthrough wiring connection 1114.17.1. The interface 906.4 may comprise, from top to bottom, a pin group 1312.16.2 for the feedthrough wiring connection 1116.16.2 and a pin group 1312.17.2 for the feedthrough wiring connection 1116.17.2. Each wiring connection and pin group may be marked by three numbers, with the second number identifying the column and the third number identifying the cache block. For example, the second number 16 of the pin group 1312.16.2 may indicate that this pin group is for column 16 and the third number 2 may indicate that this pin group is for the cache block 904.2 inside the memory block 902.1.

All signals for a bi-directional wiring connection between a column and a cache block may be grouped together. For example, all signals for the wiring connection 1110.16.3 between column 16 and cache block 904.3 may be grouped together, all signals for the wiring connection 1112.16.4 between column 16 and cache block 904.4 may be grouped together, all signals for the wiring connection 1114.16.1 between column 16 and cache block 904.1 may be grouped together, all signals for the wiring connection 1116.16.2 between column 16 and cache block 904.2 may be grouped together. This may be referred to as grouping of buses. Each pin group may be for one group of buses.

As shown in FIG. 13, pins for the interfaces 908 may be aligned along the source edge and pins for the interface 906 may be aligned along the mirror edge. In some embodiments, arrangement of pin groups may try to balance the route distances such that there is not a large difference in overall distance across all interfaces 908 and 906. Therefore, the bus order and hence the pin group order on the source edge may be largely controlled by the column stack order. In at least one embodiment, the center may be defined as where two adjacent memory block face each other, and the total number of columns may be 32 with 8 column stacks to the left of the center and 8 columns stacks to the right of the center. A column bus order (for buses from columns) on the source edge of the memory block 902.2 from left (further from center) to right (closer to center) based on the order of the 8 left column stacks may be ordered by column numbers as follows: 16, 17, 15, 18, 14, 19, 13, 20, 12, 21, 11, 22, 10, 23, 9, 24. The memory block 902.3 may be the memory block 902.2 vertically flipped (with up and down swapped). The column bus order on the source edge of the memory block 902.3 may be the same as the memory block 902.2.

Each column may have eight column-to-cache block interfaces coupled to eight cache blocks. Each column-to-cache block interface may include multiple groups of signals. In some embodiments, each group of signals may be referred to as a bus. Order of the buses and hence the pin arrangement may also try to balance the route distance. Using the memory block 902.2 as an example, the cache blocks 904.3 and 904.4 may be inside the memory block 902.2 and therefore closest to the source edge of the memory block 902.2. Therefore, the pin groups for these two cache blocks may be arranged to be further from the center than for cache blocks 904.1 and 904.2. That is, pin groups xxxx.xx.3 and xxxx.xx.4 (e.g., 1302.16.3 and 1304.16.4) may be placed to the left of pin groups xxxx.xx.1 and xxxx.xx.2 (e.g., 1306.16.1 and 1308.16.2) for all 16 columns on the source edge of the memory block 902.2. For the same reason, pin groups for cache blocks 904.5 and 904.6 may be placed to the left (further from the center) than pin groups for cache blocks 904.7 and 904.8 on the source edge of the memory block 902.3.

For columns to the right of the center, the column bus order on the source edge of the memory block 902.1 from left (closer to center) to right (further from center) based on the order of the 8 right column stacks may be ordered by column numbers as follows: 8, 25, 7, 26, 6, 27, 5, 28, 4, 29, 3, 30, 2, 31, 1, 32. For example, FIG. 10 shows that MI 124.8 in column 8 may be positioned to the left of MI 124.25 in column 25, MI 124.7 in column 7 may be positioned to the left of MI 124.26 in column 26, and MI 124.6 in column 6 may be positioned to the left of MI 124.27 in column 27. The memory block 902.4 may be the memory block 902.1 vertically flipped (with up and down swapped). The column bus order on the source edge of the memory block 902.4 may be the same as the memory block 902.1. Also, pin groups for cache blocks 904.3 and 904.4 may be placed to the left (closer to the center) than pin groups for cache blocks 904.1 and 904.2 on the source edge of the memory block 902.1, and pin groups for cache blocks 904.5 and 904.6 may be placed to the left (closer to the center) than pin groups for cache blocks 904.7 and 904.8 on the source edge of the memory block 902.4.

It should be noted that the cache block 904.3 may be closer to the column stacks (e.g., in the Y direction or vertical direction) than the cache block 904.4, and the cache block 904.1 may be closer to the column stacks than the cache block 904.2. Therefore, in some embodiments, to better balance routing between the columns and cache blocks, buses corresponding to cache blocks 904.1 and 904.3 in the memory block 902.2 may be placed further to the left (further from center), while buses corresponding to cache blocks 904.2 and 904.4 in the memory block 902.2 may be placed further to the right (closer to center). Therefore, in one embodiment, the cache block bus order (for buses from the same column to different cache blocks) may be 3, 4, 1, 2 on the source edge of the memory block 902.2. For the same reason, the cache block bus order for the source edge of the memory block 902.3 may be 6, 5, 8, 7. For the columns on the right of the center, the cache block bus order may also be determined based on the cache blocks' vertical distance to the column stacks but that is not required.

In one embodiment, the cache block bus order for columns on the right of the center may be the same as the cache block bus order for columns on the left of the center because the column stacks may be identical. For example, a functional logic block in a hardware design language implementing a column stack may be used for all column stacks, regardless of whether a column stack may be placed on the left or right of the center. Therefore, the pin group order for each column may be the same on the column side and the corresponding pin group order may be the same on the memory block side.

In some embodiments, because of the size of the column stacks and memory blocks, it may be hard for all signals to traverse the interfaces in a single cycle. In at least one embodiment, delay stages may be placed between the column boundary and the boundary of a cache block (e.g., the boundary of the registers in the cache blocks) in the wiring connections. For example, each of the wiring connections 1114.16.1, 1116.16.2, 1110.16.3, 1112.16.4, 1114.17.1, 1116.17.2, 1110.17.3 and 1112.17.4 may have multiple delay stages (e.g., FIFO buffers) inside the memory block 902.2. In one embodiment, the number of delay stages may be three and the number of delay stages may be equal for all wiring connections between each column and each cache block such that all columns may have the same latency for accessing any cache block.

The feedthrough bus on the mirror edge of the memory block 902.2 may also be ordered to balance bus route distances. For example, feedthrough buses for columns 16 and 17 may be placed highest in the Y-direction (closest to column stacks) because columns 16 and 17 are furthest from the center, while feedthrough buses for columns 9 and 24 may be placed lowest (furthest from column stacks). Moreover, all busses corresponding to cache blocks 904.3 and 904.1 may be grouped together, lined up with the cache block logic closest to the column stacks; and all busses corresponding to cache blocks 904.2 and 904.4 may be grouped together, lined up with the cache block logic further from the column stacks. This may generate a direct, almost zero-route interface along the mirror edge inside of both the memory block 902.2 and memory block 902.1.

FIG. 13 illustrates that the interface 906.3 may comprise the pin group 1310.16.1 and pin group 1310.17.1, and the interface 906.4 may comprise the pin group 1312.16.2 and pin group 1312.17.2. It should be noted that the interface 906.3 not only includes feedthrough buses from the memory block 902.2 to the memory block 902.1, but also feedthrough buses from the memory block 902.1 to the memory block 902.2. These buses may be mirrored on the memory blocks 902.2 and 902.1 such that they abut and minimize routing resource. Therefore, the bus order may be replicated on both sides, while pin order within the buses may be reversed to line up inputs and outputs for each bit. In one embodiment, the bus order for column index may be interspersed between left-side and right-side column indices. To balance route distances, the buses for columns may be interleaved evenly based on columns, starting with right-side columns furthest from the center, followed by left-side columns, then right, then left, with a resulting bus order for both interfaces 906.3 and 906.4 on the mirror edge as: 32, 16, 1, 17, 31, 15, 2, 18, 30, 14, 3, 19, 29, 13, 4, 20, 28, 12, 5, 21, 27, 11, 6, 22, 26, 10, 7, 23, 25, 9, 8, 24. For the interface 906.3, the left-side columns are accessing the cache block 904.1 in the memory block 902.1 and the right-side columns are accessing the cache block 904.3 in the memory block 902.2. For the interface 906.4, the left-side columns are accessing the cache block 904.2 in the memory block 902.1 and the right-side columns are accessing the cache block 904.4 in the memory block 902.2.

In various embodiments of a memory block, routing resources are precious. Therefore, in some embodiments implemented with multi-layer technology, several routing layers may be used to reduce timing and signal integrity issues. The individual pins may be interspersed and overlapping on the different routing layers. Within each interface, a bus may be assigned to a routing layer, while some buses may be assigned to share one routing layer. Interspersing signals and utilizing several layers may improve signal integrity, and reduce crosstalk and noise between signals.

In an exemplary embodiment, a processor may comprise: a plurality of columns of vector processing units arranged in a two-dimensional column array with a plurality of column stacks placed side-by-side in a first direction and each column stack having two columns stacked in a second direction, and a memory unit divided into two portions that are placed on two opposite sides of the column array in the second direction. Each column may include a processing element (PE) that has a vector Arithmetic Logic Unit (ALU). Each portion of the memory unit may contain two memory blocks placed side-by-side in the first direction. Each memory block may contain two cache blocks and a plurality banks of memory cells. And the two cache blocks may be placed along a first edge abutting an adjacent memory block, the plurality of banks of memory cells may be placed to space from the first edge in the first direction by the two cache blocks and from a second edge abutting the column array in the second direction by routing channels.

In one embodiment, in each memory block, the plurality of banks of memory cells may be arranged with gaps in between to accommodate routing for connections between the plurality of banks of memory cells and the cache blocks in the respective memory block.

In one embodiment, the gaps may have different widths with gaps closer to the cache blocks in the respective memory block having wider width than gaps further from the cache blocks in the respective memory block.

In one embodiment, the second edge of each memory block may have a plurality of source edge interfaces each comprising a plurality of buses for a column in a column stack abutting the respective memory block to be coupled to the cache blocks in the respective memory block and cache blocks in the adjacent memory block.

In one embodiment, pins for the plurality of buses of each of plurality of source edge interfaces may be interspersed and overlapping on different routing layers.

In one embodiment, among the plurality of buses of each source edge interface, pin groups for buses coupled to cache blocks in the respective memory block may be placed further from the first edge compared to pin groups for buses coupled to cache blocks in the adjacent memory block.

In one embodiment, among the plurality of buses of each source edge interface, buses coupled to the cache blocks in the adjacent memory block may be feedthrough buses passing through the respective memory block.

In one embodiment, along the first edge, buses for different columns coupled to a same cache block in the adjacent memory block may be grouped together in one mirror edge interface and placed in an order in the second direction with buses from a further column placed closer to the column array than a closer column.

In one embodiment, the mirror edge further may include buses for columns in the adjacent memory block to access a cache block in the respective memory block.

In one embodiment, for at least one memory block of the memory blocks, among the plurality of buses of each source edge interface, pin groups for buses coupled to cache blocks closer to the column stacks may be placed further from the first edge compared to pin groups for buses coupled to cache blocks further from the column stack.

In one embodiment, the routing channels may include data buses and address buses for wiring connections between columns in column stacks abutting the respective memory block and the cache blocks in the respective memory block and its adjacent memory block.

In one embodiment, each cache block may have a first cache for shared memory access and a second cache for private memory access, and the wiring connections for each column may include separate wiring connections to the first cache and the second cache.

In one embodiment, the wiring connections may include one or more delay stages in each memory block.

In one embodiment, wiring connections for all columns to all cache blocks may have a same number of delay stages to have a same memory access latency.

In one embodiment, inside each column stack, wiring connections for a first column to access memory blocks on an opposite side of the column stack may pass through a second column within the respective column stack to reach contact pins on the opposite side of the column stack.

In one embodiment, each column may further include a memory interface that contains functional logic to drive the data buses and address buses to the memory blocks, and the memory interface may be placed close or at the middle of a respective column stack in the second direction.

In one embodiment, each column may further include a memory port (MP) providing vector memory operations and a switch box (SB) providing vector data switching for the PE in the respective column.

In one embodiment, a column-to-column interface for one column of the plurality of columns may include an address bus for the MP in the column, a first type of data buses for outputs from the PE in the column and a second type of data buses for SB to SB data routing.

In one embodiment, the first type of data buses and the second type of data buses may be bit-aligned with bits at same positions of different data buses grouped to be fed into same functional logic.

In one embodiment, pins for the first type of data buses and second type of data buses of the column-to-column interface may be arranged in an interleaving placement pattern.

The techniques described herein may be implemented in one or more application specific integrated circuits (ASICs) in digital logic gates, or by a processor that executes instructions stored in a tangible processor readable memory storage media.

In one embodiment, any of the disclosed methods and operations may be implemented in software comprising computer-executable instructions stored on one or more computer-readable storage media. The one or more computer-readable storage media may include non-transitory computer-readable media (such as removable or non-removable magnetic disks, magnetic tapes or cassettes, solid state drives (SSDs), hybrid hard drives, CD-ROMs, CD-RWs, DVDs, or any other tangible storage medium), volatile memory components (such as DRAM or SRAM), or non-volatile memory components (such as hard drives)). The computer-executable instructions may be executed on a processor (e.g., a microcontroller, a microprocessor, a digital signal processor, etc.). Moreover, an embodiment of the present disclosure may be used as a general-purpose processor, a graphics processor, a microcontroller, a microprocessor, or a digital signal processor.

It should be noted that as used herein, a "coupling" and a "connection" between two components, such as one component being "coupled" or "connected" to another component may refer to an electronic connection between two components, which may include but not limited to, by electronic wiring, through an electronic element (e.g., a resistor, a transistor), etc.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A processor, comprising:
a plurality of columns of vector processing units arranged in a two-dimensional column array with a plurality of column stacks placed side-by-side in a first direction and each column stack having two columns stacked in a second direction, each column including a processing element (PE) that has a vector Arithmetic Logic Unit (ALU); and
a memory unit divided into two portions that are placed on two opposite sides of the column array in the second direction, wherein:
each portion of the memory unit contains two memory blocks placed side-by-side in the first direction,
each memory block contains two cache blocks and a plurality banks of memory cells, and
the two cache blocks are placed along a first edge abutting an adjacent memory block, the plurality of banks of memory cells are placed to space from the first edge in the first direction by the two cache blocks and from a second edge abutting the column array in the second direction by routing channels.

2. The processor of claim 1, wherein, in each memory block, the plurality of banks of memory cells are arranged with gaps in between to accommodate routing for connections between the plurality of banks of memory cells and the cache blocks in the respective memory block.

3. The processor of claim 2, wherein the gaps have different widths with gaps closer to the cache blocks in the respective memory block having wider width than gaps further from the cache blocks in the respective memory block.

4. The processor of claim 1, wherein the second edge of each memory block has a plurality of source edge interfaces each comprising a plurality of buses for a column in a column stack abutting the respective memory block to be coupled to the cache blocks in the respective memory block and cache blocks in the adjacent memory block.

5. The processor of claim 4, wherein pins for the plurality of buses of each of plurality of source edge interfaces are interspersed and overlapping on different routing layers.

6. The processor of claim 4, wherein among the plurality of buses of each source edge interface, pin groups for buses coupled to cache blocks in the respective memory block are placed further from the first edge compared to pin groups for buses coupled to cache blocks in the adjacent memory block.

7. The processor of claim 6, wherein, among the plurality of buses of each source edge interface, buses coupled to the cache blocks in the adjacent memory block are feedthrough buses passing through the respective memory block.

8. The processor of claim 6, wherein along the first edge, buses for different columns coupled to a same cache block in the adjacent memory block are grouped together in one mirror edge interface and placed in an order in the second direction with buses from a further column placed closer to the column array than a closer column.

9. The processor of claim 8, wherein the mirror edge further include buses for columns in the adjacent memory block to access a cache block in the respective memory block.

10. The processor of claim 6, wherein for at least one memory block of the memory blocks, among the plurality of buses of each source edge interface, pin groups for buses coupled to cache blocks closer to the column stacks are placed further from the first edge compared to pin groups for buses coupled to cache blocks further from the column stack.

11. The processor of claim 1, wherein the routing channels include data buses and address buses for wiring connections between columns in column stacks abutting the respective memory block and the cache blocks in the respective memory block and its adjacent memory block.

12. The processor of claim 11, wherein each cache block has a first cache for shared memory access and a second cache for private memory access, and the wiring connections for each column include separate wiring connections to the first cache and the second cache.

13. The processor of claim 11, wherein the wiring connections include one or more delay stages in each memory block.

14. The processor of claim 13, wherein wiring connections for all columns to all cache blocks have a same number of delay stages to have a same memory access latency.

15. The processor of claim 14, wherein inside each column stack, wiring connections for a first column to access memory blocks on an opposite side of the column stack pass through a second column within the respective column stack to reach contact pins on the opposite side of the column stack.

16. The processor of claim 15, wherein each column further includes a memory interface that contains functional logic to drive the data buses and address buses to the memory blocks, and the memory interface is placed close or at the middle of a respective column stack in the second direction.

17. The processor of claim 1, wherein each column further includes a memory port (MP) providing vector memory operations and a switch box (SB) providing vector data switching for the PE in the respective column.

18. The processor of claim 17, wherein a column-to-column interface for one column of the plurality of columns includes an address bus for the MP in the column, a first type of data buses for outputs from the PE in the column and a second type of data buses for SB to SB data routing.

19. The processor of claim 18, wherein the first type of data buses and the second type of data buses are bit-aligned with bits at same positions of different data buses grouped to be fed into same functional logic.

20. The processor of claim 19, wherein pins for the first type of data buses and second type of data buses of the column-to-column interface are arranged in an interleaving placement pattern.

* * * * *